OR  4,023,887

United States Patent [19]

Speers

[11] 4,023,887
[45] May 17, 1977

[54] OPTICAL COMMUNICATION, SWITCHING AND CONTROL APPARATUS AND SYSTEMS AND MODULAR ELECTRO-OPTICAL LOGIC CIRCUITS, AND APPLICATIONS THEREOF

[75] Inventor: Daniel E. Speers, Westport, Conn.

[73] Assignee: General Optimation, Inc., Southport, Conn.

[22] Filed: Apr. 4, 1975

[21] Appl. No.: 565,153

Related U.S. Application Data

[63] Continuation of Ser. No. 301,944, Oct. 30, 1972, abandoned.

[52] U.S. Cl. .............................. 350/96 C; 250/227
[51] Int. Cl.² ........................................ G02B 5/14
[58] Field of Search .................. 350/96 C, 96 WG

[56] References Cited

UNITED STATES PATENTS

| | | | |
|---|---|---|---|
| 3,508,807 | 4/1970 | Mayer | 350/96 C |
| 3,768,146 | 10/1973 | Braun et al. | 350/96 C |
| 3,861,781 | 1/1975 | Hasegawa et al. | 350/96 C |
| 3,912,574 | 10/1975 | Cherin et al. | 350/96 C |

OTHER PUBLICATIONS

Stallard et al., "Stuffing of Optical Fibers," IBM Tech. Dis. Bull., vol. 9, No. 11, Apr. 1967.
Bisbee, "Optical Fiber Joining Technique," Bell System Tech. Jour., vol. 50, No. 10, Dec. 1971.

*Primary Examiner*—John K. Corbin
*Assistant Examiner*—Jon W. Henry
*Attorney, Agent, or Firm*—Parmelee, Johnson & Bollinger

[57] ABSTRACT

Optical communication, switching and control apparatus and systems are disclosed, including modular electro-optical logic circuits, methods of construction and assembly of such modules and applications thereof. Optical transmission lines are interconnected by convenient connectors, and are assembled with switches, and optical signals, including visible light radiation, ultraviolet radiation and infra-red radiation are transmitted over the lines for carrying data and/or central signals. The optical transmission and control systems are used to control illumination, vehicle equipment, manufacturing and chemical processes, machinery, home appliances, and are used to monitor medical conditions in the human body. The electro-optical modules are assembled together with their respective light radiation transmitting windows or optical ports in communication one with another in computer equipment.

3 Claims, 53 Drawing Figures

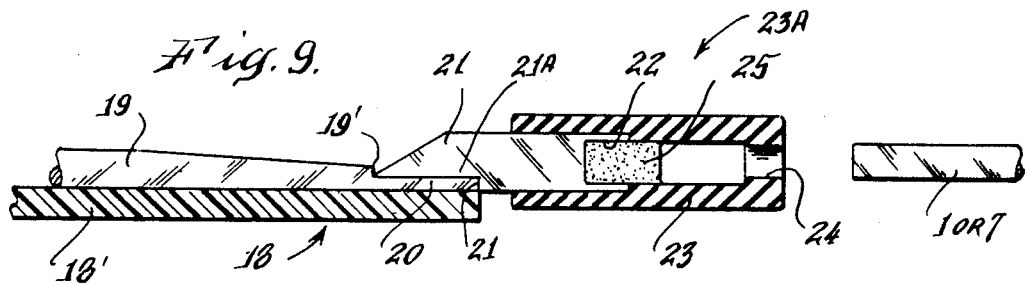
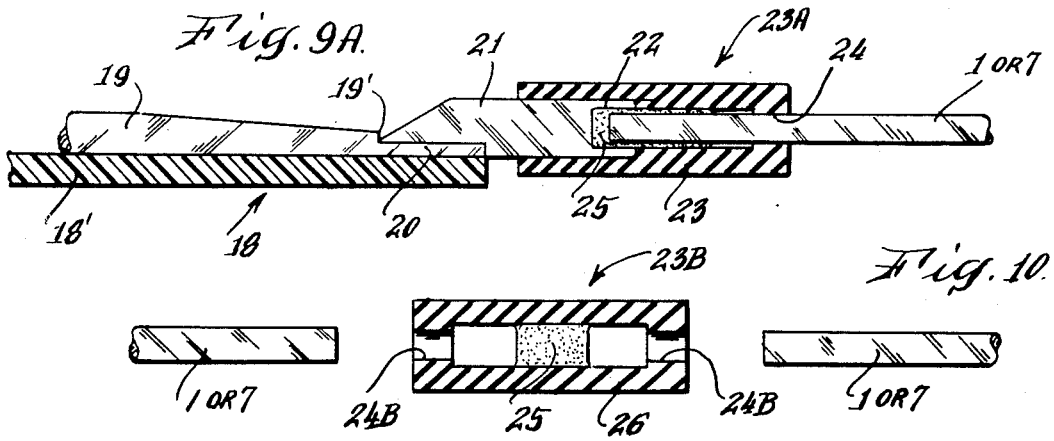
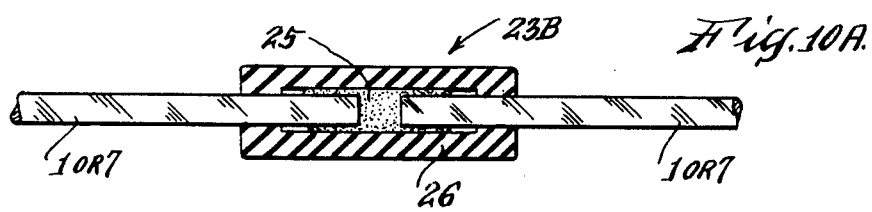
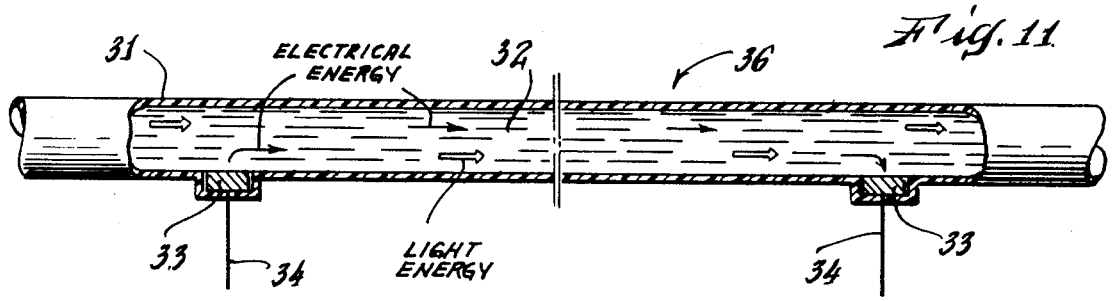
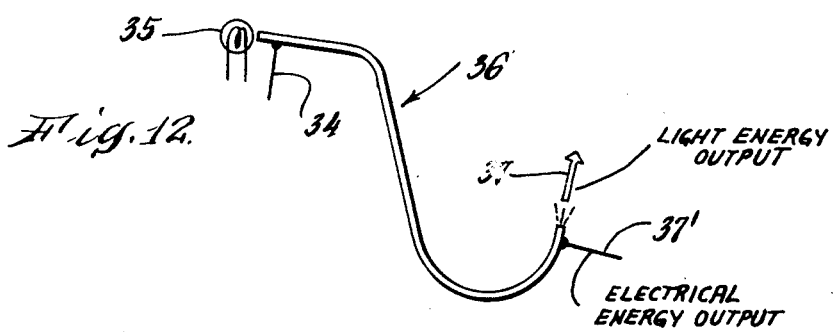

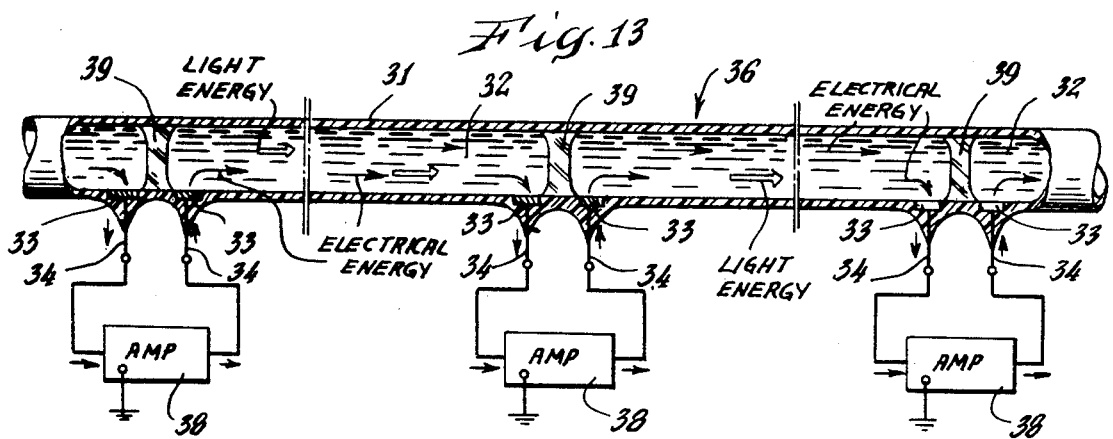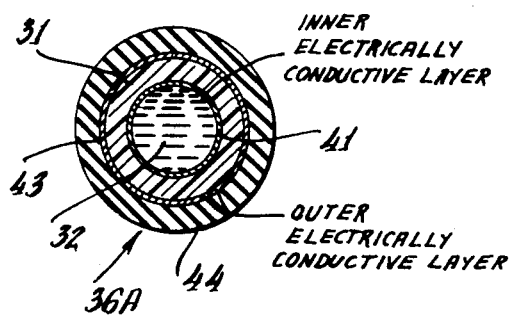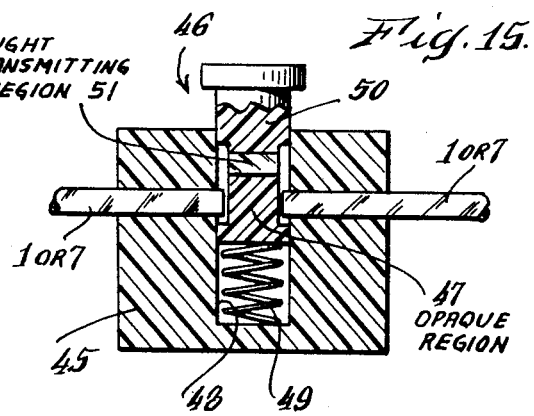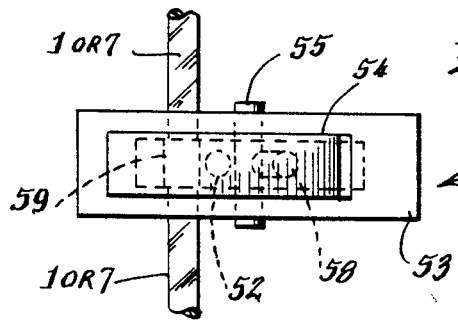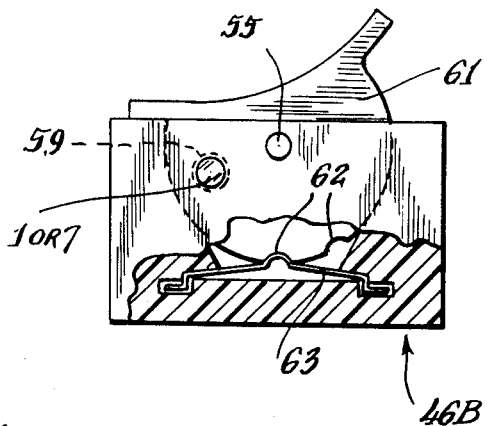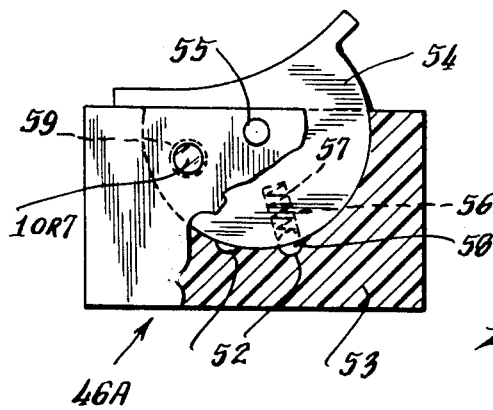

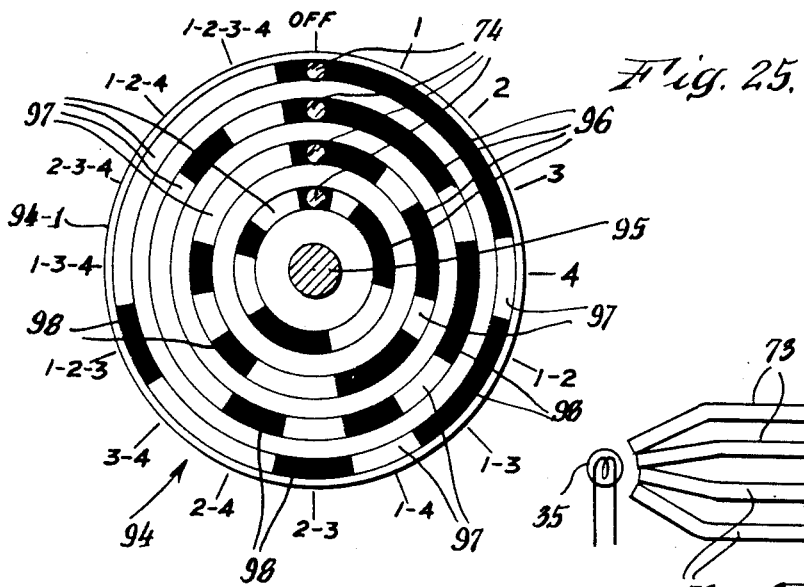
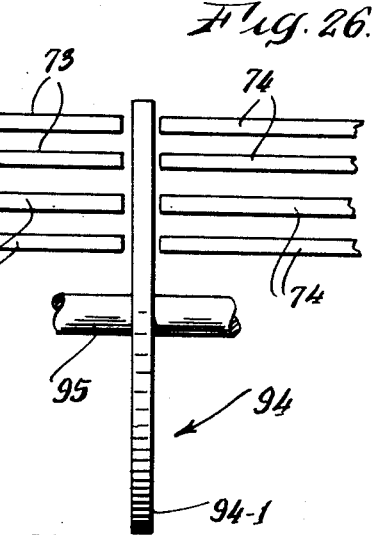
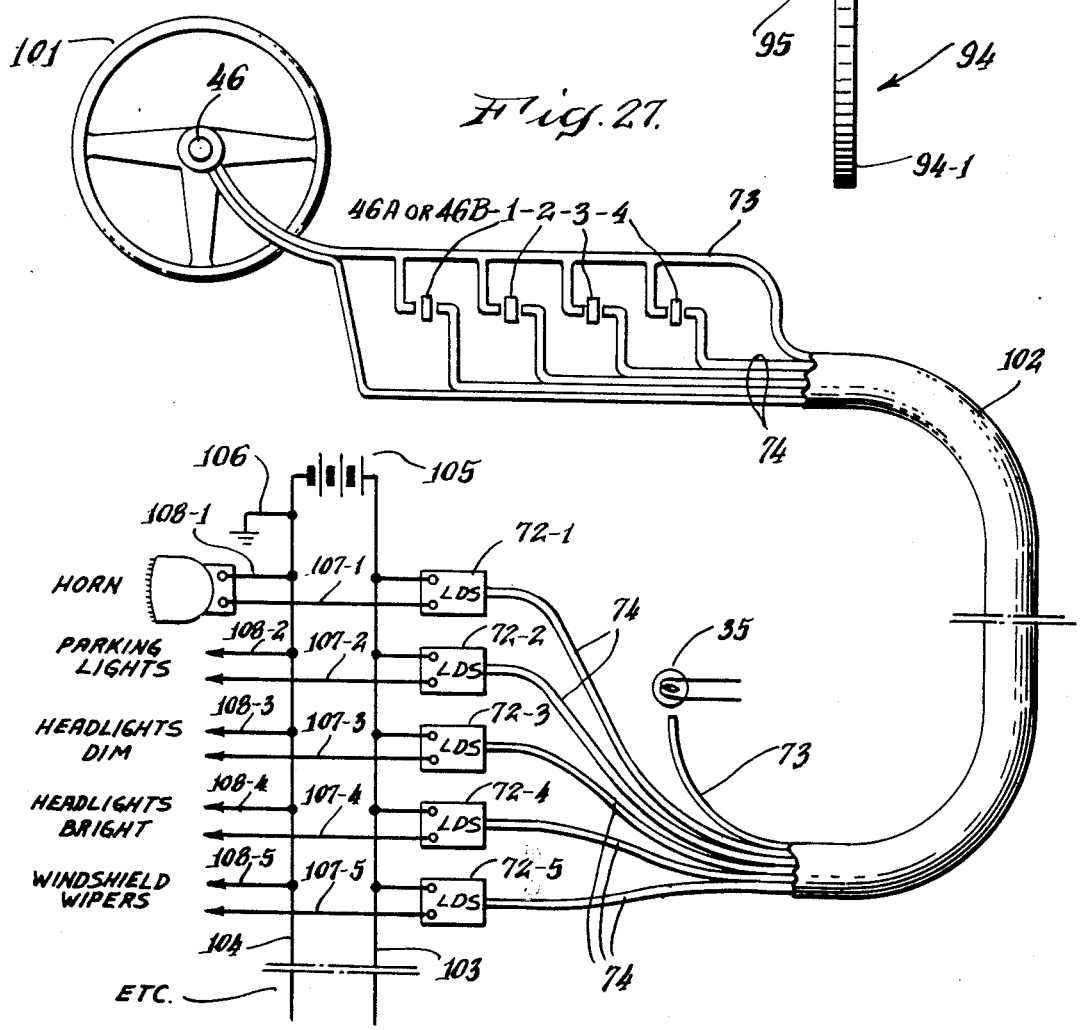

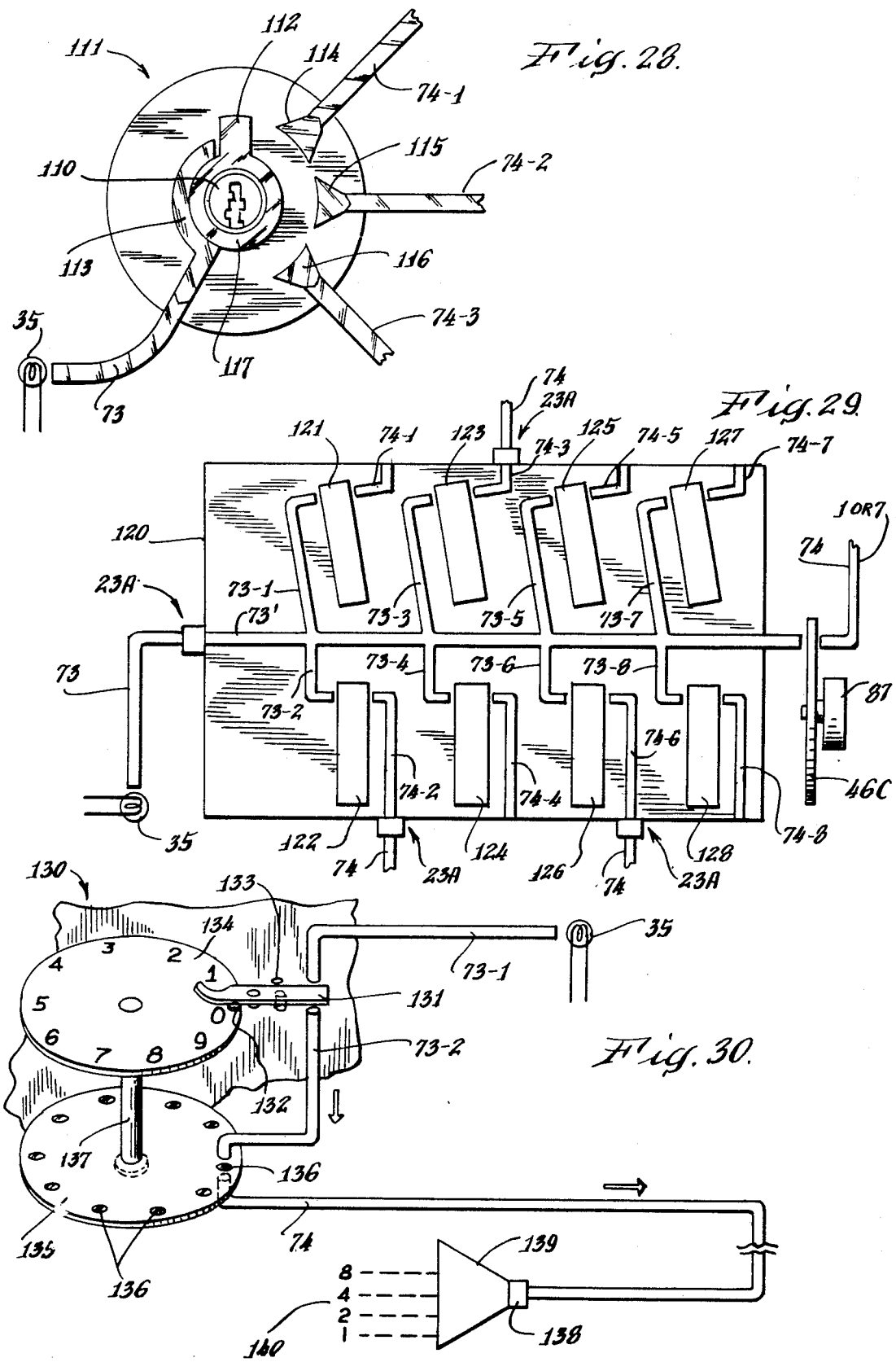

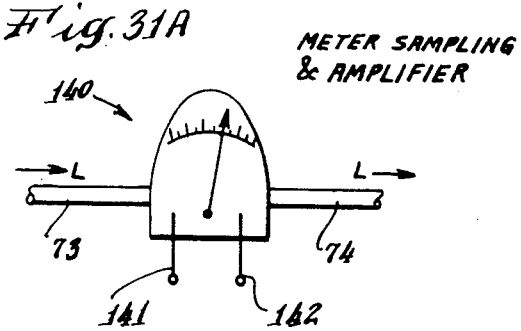
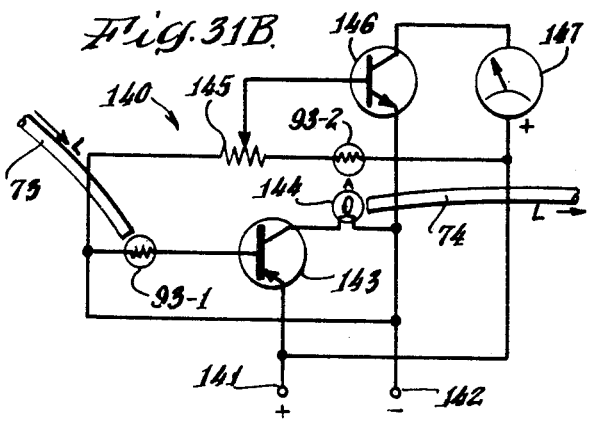
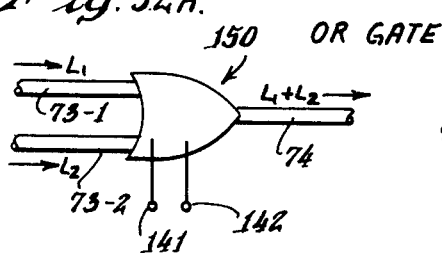
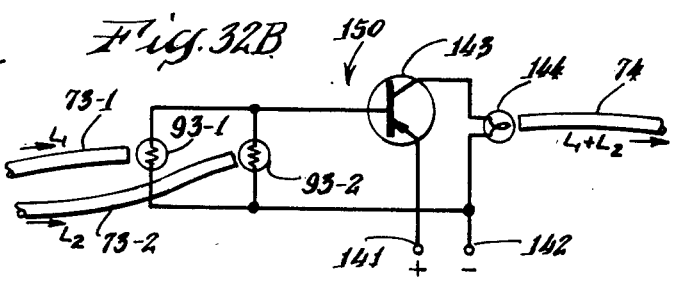
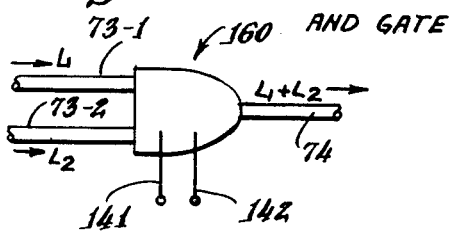
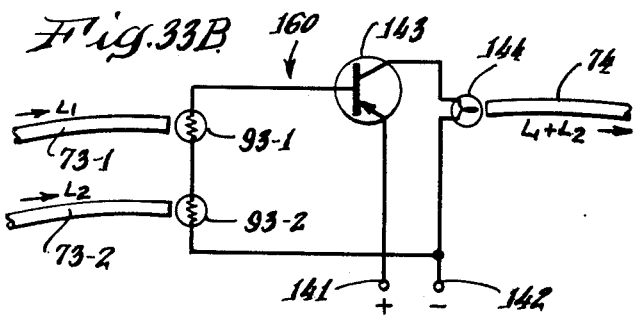
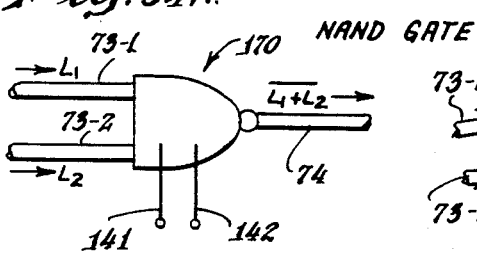
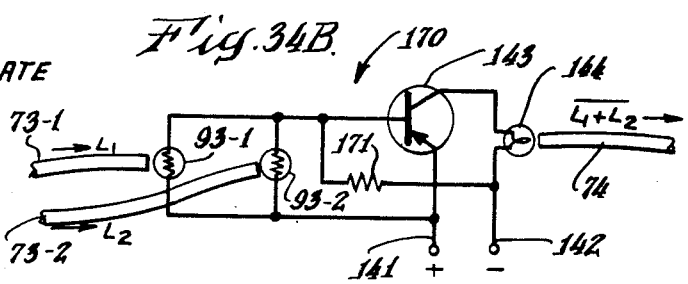
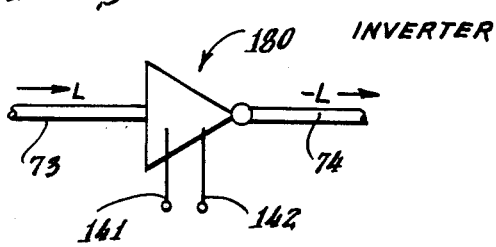
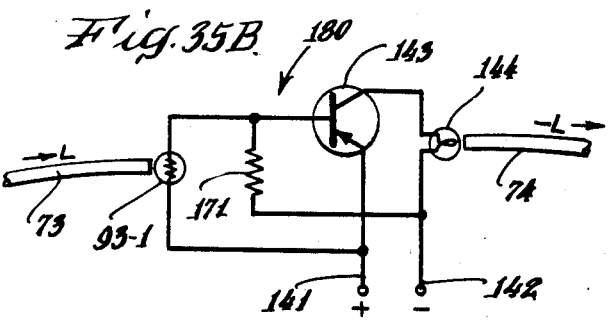

AMPLIFIER

AMPLIFIER WITH RFO

OPTICAL FLIP FLOP

AO GATE
Fig. 39A.
Fig. 39B.
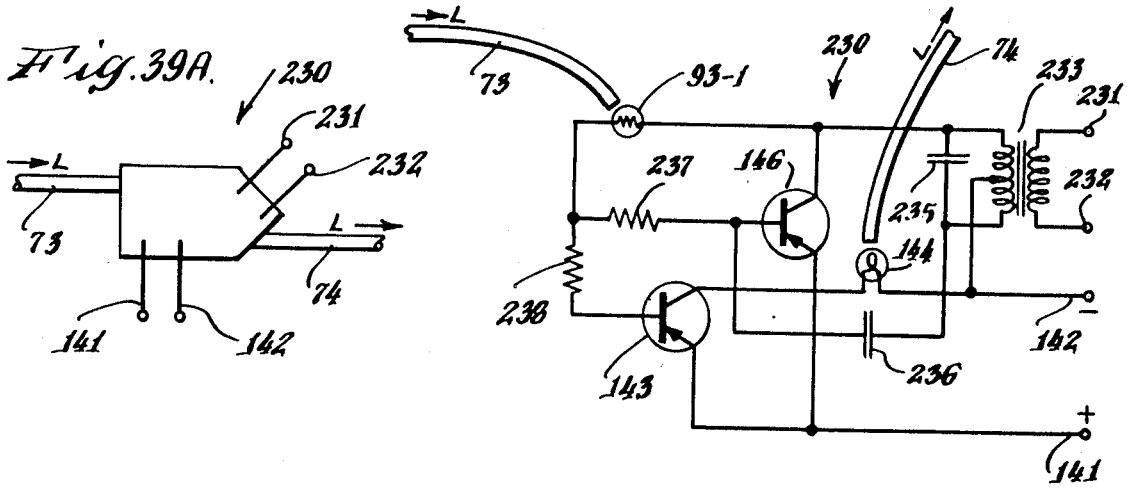
Fig. 40.
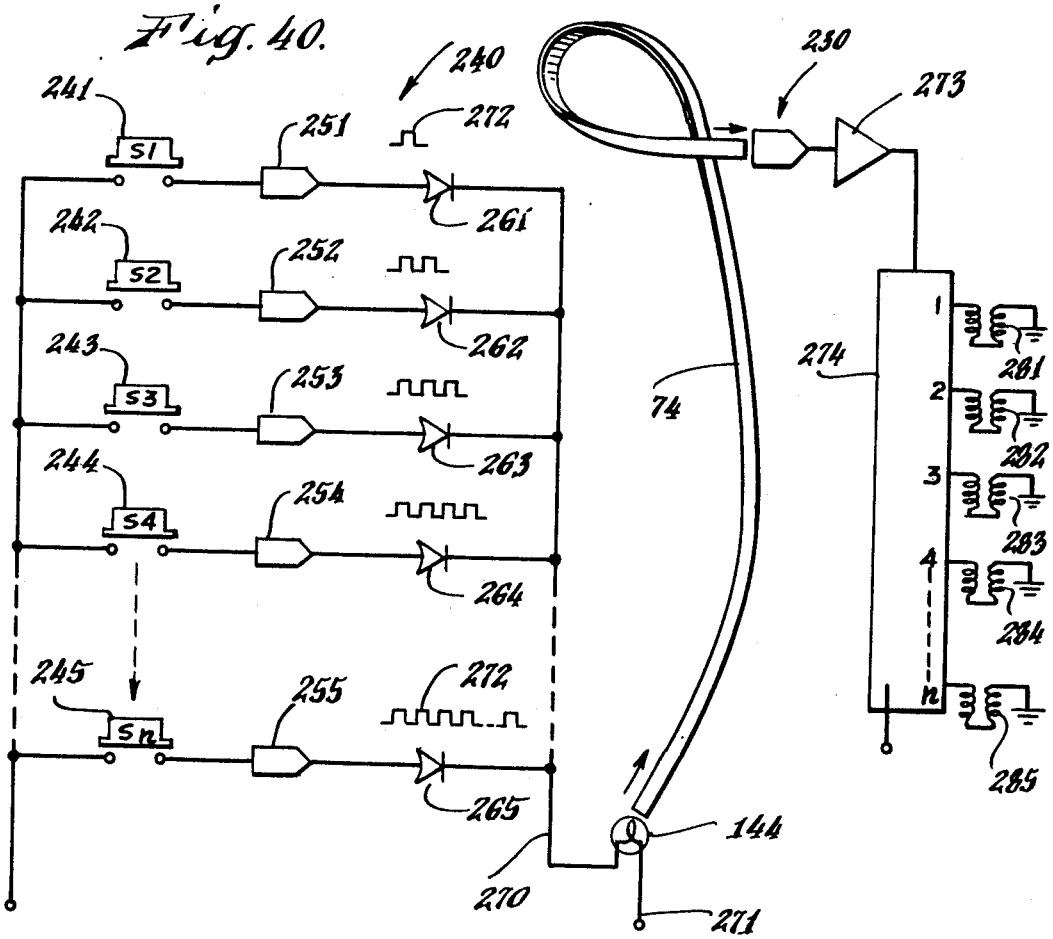

OPTICAL COMMUNICATION, SWITCHING AND CONTROL APPARATUS AND SYSTEMS AND MODULAR ELECTRO-OPTICAL LOGIC CIRCUITS, AND APPLICATIONS THEREOF

This application is a continuation of application Ser. No. 301,944, filed Oct. 30, 1972, and now abandoned.

DESCRIPTION

This invention relates to electro-optical circuits which perform logic and switching functions employing optical radiation directed along and through various optical circuits.

It is the purpose of this invention to provide modular electronic circuits which interact with and can be controlled by optical radiation.

It is a further purpose of this invention to provide methods and apparatus for detecting and amplifying optical radiation.

It is a further purpose of this invention to provide methods and apparatus for detecting and switching optical radiation.

It is a further purpose of this invention to provide methods and apparatus for utilizing optical radiation for controlling and for performing switching and logic functions.

It is a further purpose of this invention to enable simplifications and cost savings to be made in electrical wiring, particularly in electrical circuits involving switching and control applications.

It is a further purpose of this invention to provide methods and apparatus for reducing the labor and expense of installing electrical wiring.

It is a further purpose of this invention to provide optical radiation control and switching methods and apparatus enabling increased reliability and safety to be obtained in electrical wiring circuits.

It is a further purpose of this invention to provide electronic circuits which perform logic functions based upon single-mode or multiple-mode input of optical radiation.

Among the many features and advantages of the present invention are those resulting from the fact that the methods and apparatus embodying the invention can be employed in many different control circuit and switching circuit applications and moreover, the modules described can be utilized for numerous purposes and applications, as will become more fully understood as this specification proceeds.

In order to more fully describe the various embodiments of the instant invention, the subject matter of this specification is divided into sections, as will be apparent from the headings which are included for the convenience of the reader.

As used herein, the terms "optical radiation" and/or "light radiation" are intended to mean visible light as well as electromagnetic radiation having wavelengths near to those of visible light such that they follow the principles of optics, namely, ultraviolet radiation and/or infrared radiation.

Also, the term "light source" is intended to mean a source which emits visible light and/or ultraviolet radiation and/or infrared radiation. Similarly, the term "light detecting" apparatus or "light responsive" apparatus, or similar term, is intended to mean apparatus capable of detecting and/or responding to visible light and/or ultraviolet radiation and/or infrared radiation.

The term "fiber optic line" or "optic line" or "optic cable" is intended to mean a conduit or group of conduits for conducting visible light and/or ultraviolet radiation and/or infrared radiation along a predetermined path or predetermined paths, as provided by the optic element, or elements, of such a line or cable.

The adjective "optic" or "optical", as applied to components herein, is intended to mean that the component to which "optic" or "optical" refers is associated with or characterized by a functional relationship with visible light and/or ultra-violet radiation and/or infrared radiation.

The phrase "optic strand" or "optical strand" is intended to mean a strand containing a single optic fiber and also to mean a strand containing multiple optic fibers grouped together so as to act in concert as a single optic conduit.

The various features, aspects and advantages of the present invention will, in part, be pointed out and will, in part, become apparent from a consideration of this specification in conjunction with the accompanying drawings.

BRIEF DESCRIPTION OF THE DRAWINGS

FIGS. 9 and 9A are enlarged sectional views showing the formation of an interconnection between the connector of FIGS. 8 and 8A and an individual optical strand;

FIGS. 10 and 10A are enlarged cross-sectional views showing the use of a connector for making a connection between individual optic strands;

FIG. 11 is an enlarged cross-sectional view of a dual-spectrum transmission line system in which light energy and electrical energy are transmitted through the same system;

FIG. 12 is a schematic circuit diagram of a dual-spectrum transmission system for handling both light radiation and electrical energy;

FIG. 13 is an enlarged cross-sectional view of a dual-spectrum transmission line system including periodically spaced amplifiers;

FIG. 14 is an enlarged cross-sectional view of a dual-spectrum transmission cable having an optic core with multiple electrically conductive layers therearound;

FIG. 15 is an enlarged cross-sectional view of a push button optical switch;

FIG. 16 is an enlarged elevational and partially sectional view of a snap action optical switch;

FIG. 16A is a top plan view of the switch shown in FIG. 16;

FIG. 17 is a view similar to FIG. 16 showing a modified embodiment of a snap action optical switch;

FIGS. 25 and 26 are front and side elevational views, respectively, of a 4-pole, 15-position optical switch;

FIG. 27 is a schematic diagram of an optic control system embodying the invention for controlling the various items of equipment on a vehicle;

FIG. 28 shows an optical ignition switch for use on a vehicle;

FIG. 29 is a diagram of an optical control panel including multiple switches for controlling various remotely located components, such as the items of equipment on a vehicle;

FIG. 30 shows a rotatable dialing optical switch control system. This optical switch generates a sequence of light pulses transmitted over an optical line in accordance with the numbers being dialed by the user, which can be converted to binary form, if desired.

FIGS. 31A and 31B show a light intensity meter sampling and light amplifying module;

FIGS. 32A and 32B show an optical "OR" gate module;

FIGS. 33A and 33B show an optical "AND" gate module;

FIGS. 34A and 34B show an optical "NAND" gate module;

FIGS. 35A and 35B show an optical logic converter module;

FIGS. 39A and 39B show a light radiation intensity amplifier gate module providing both audio and optical output signals; and FIG. 40 shows an optical control system employing pulsed light radiation.

DETAILED DESCRIPTION

Optical Transmission and Connection Components and Systems

For conducting light radiation from point-to-point and for optical control of the operation of various components or items of equipment, there are various advantageous optical transmission and connection components and systems embodying the present invention.

Figure 1:
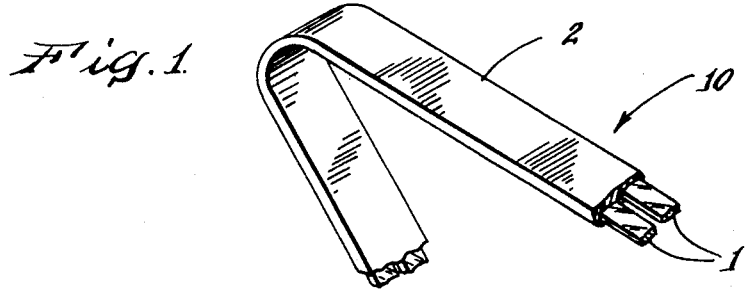
FIG. 1 is a perspective view, drawn on an enlarged scale, showing an optic cable containing a plurality of flat optic fibers.

FIG. 1 illustrates a flexible flat optic cable 10 containing a plurality of optical strands 1, each having a rectangular cross section. Each of the optical strands 1 may comprise a single optic fiber having a rectangular cross section, as may comprise a plurality of optic fibers grouped together to define a rectangular cross section and acting in concert as a single conduit for light radiation. These strands 1 are made from optical material, i.e. material capable of transmitting light radiation, for example, such as glass, transparent plastic, methyl methacrylate, or hollow members containing optical liquid, such as dimethylformamide. The optic strands 1 can be made by various suitable techniques for forming glass or plastic, such as by casting, extruding, drawing or spinning to provide the flat configuration, as shown.

The optic strands 1 are embedded in an opaque protective coating of flexible material, such as rubber, polyurethane, vinyl plastic, or the like.

Figures 2, 3, 4:
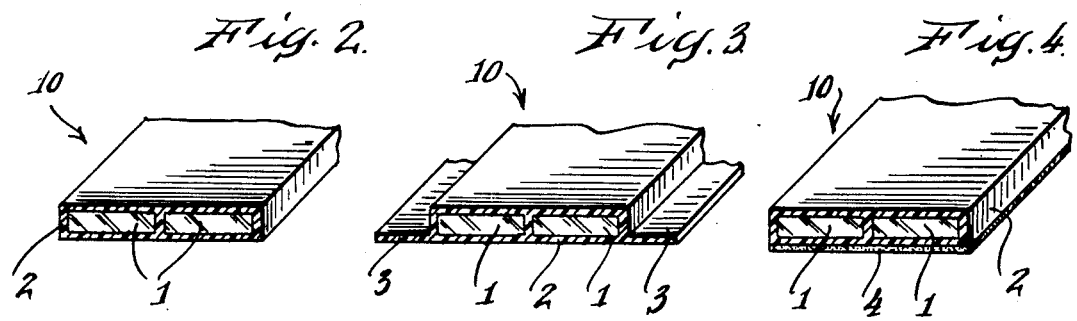
FIG. 2 is an enlarged cross-sectional and perspective view of the optic cable of FIG. 1.
FIG. 3 is an enlarged cross-sectional and perspective view of a modified embodiment of such an optic cable containing a pair of opposed projecting co-planar flanges or wings adapted for mounting or securing the cable against a base plate, wall, ceiling, panel, chassis or other surface.
FIG. 4 is an enlarged cross-sectional and perspective view of a further modified embodiment of such an optic cable having an adhesive coating layer for securing the cable in position onto a supporting surface.

Such a cable 10 can be laminated to a wall in a building or in a vehicle, or held in place by wall panelling or molding when the base of the cable, as shown in FIG. 3 is extended slightly to form mounting wings or flanges 3. In FIG. 4, a flat optic cable is shown which has an adhesive coating layer 4 applied to the base for convenience in mounting. This pressure-sensitive adhesive layer 4 is initially covered by a peelable film which is stripped off to expose the adhesive when the cable 10 is to be mounted on a wall, panel or other structure.

Figure 5:
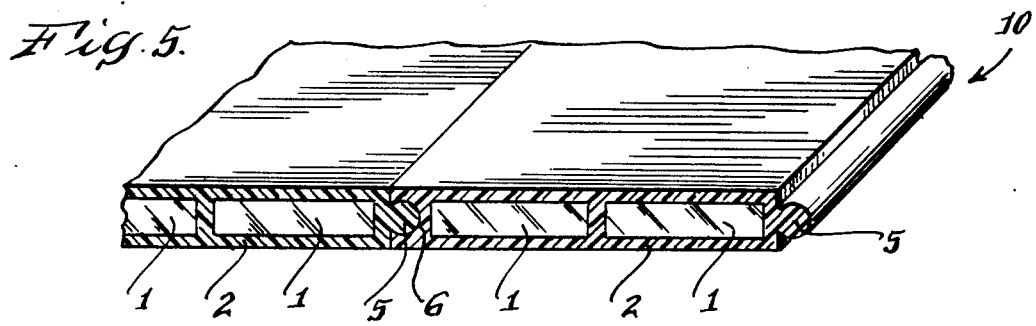
FIG. 5 is an enlarged cross-sectional and perspective view of another embodiment of such flat optical cables in which adjacent cables can conveniently be secured together in edge-to-edge relationship by tongue and groove connection means.

As shown in FIG. 5, these flat optic cables 10 can be interconnected by a tongue 5 and groove 6 incorporated along their opposite edges. The tongue and groove is formed in the flexible material 2 which encases the optic strands 1.

Figure 6:
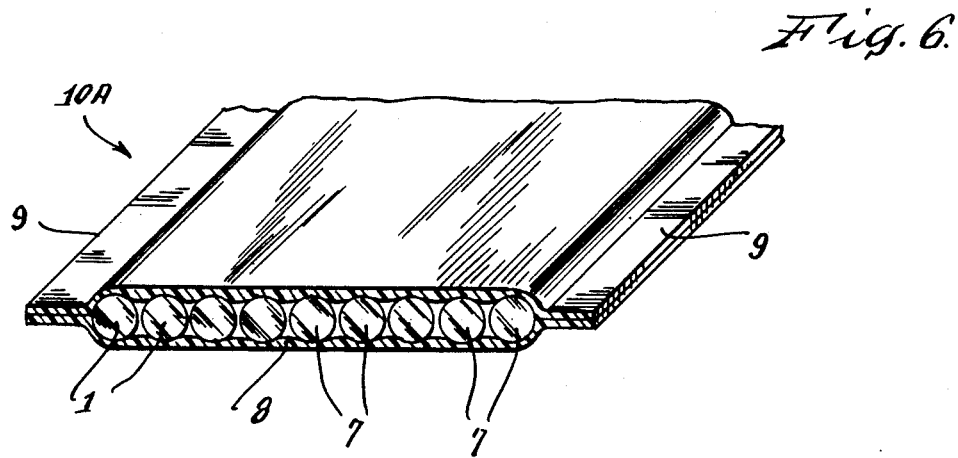
FIG. 6 shows a flat optical cable manufactured by assembling multiple optic strands sandwiched between strips of flexible material, such as plastic film.
Figure 7:
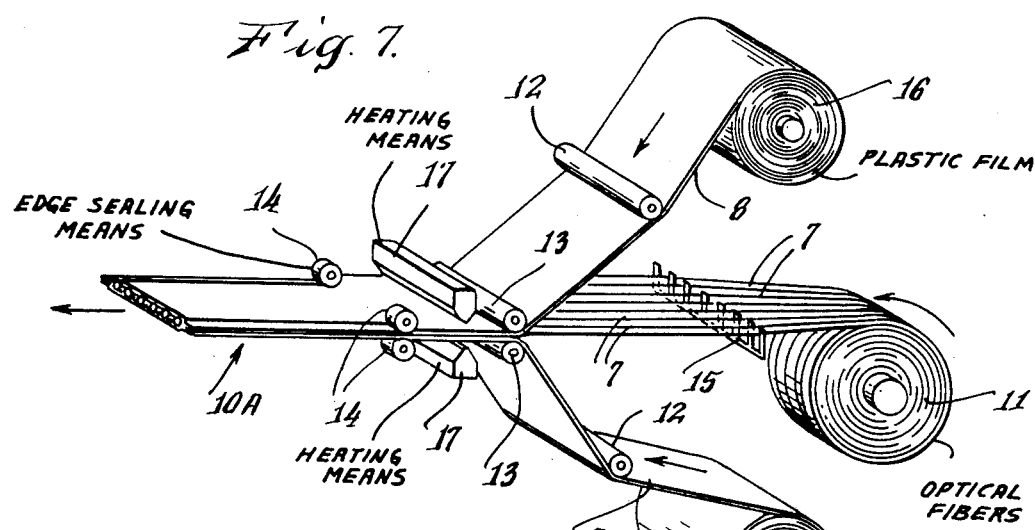
FIG. 7 is a perspective view illustrating process and apparatus for making the flat optical cable shown in FIG. 6.

An arrangement of multiple round optical fibers 7 in a flexible flat cable 10A is shown in FIG. 6. A plurality of single optic fibers 7 are held in alignment by sandwiching between layers of flexible, opaque, plastic film 8 above and below the fibers, the film 8 being sealed along the flanges 9. This method of manufacture is particularly suited to mass production of fiber optic tapes 10A, as shown in FIG. 7, in which two rolls 16 of opaque, flexible plastic film 8 are mounted above and below a roll 11 of the optical fibers 7. The plastic film layers 8 are guided by rollers 12 into position between an opposed pair of guide and pressure rollers 13 which hold the film in contact with the optical fibers 7.

The resulting sandwich then passes through edge-heating sealing rollers 14 which heat seal the edges of the tape 10A. Additional heating bar means 17 can be used to soften the film in order more firmly to bond with the optical fibers. Further, guide combs 15 can be used to orient and align the fibers 7 prior to being sealed in the laminate tape optic cable 10A.

Such tape cables 10 and 10A can be extremely flat, light-weight and compact and thus highly useful for replacing copper wiring in control and switching applications. Additionally, since there is no electrical shock hazard from light radiation, such tape cables 10 and 10A are far safer than conventional wiring. In one application, which will be further described in this disclosure, these tapes are used to control and switch room lighting by replacing conventional electrical switches. Since the tapes are flat, they can be laminated directly to a wall and covered with paint, wallpaper, or paneling, and thus eliminate the need for conduit, tubing or protective armour. Additionally, the optical control systems, described later on, are less expensive to install than electrical wiring for accomplishing the same purposes.

Although the optic elements 7 have been described as single optic fibers, it is to be understood that in cases where a greater light radiation conducting capacity is desired, these elements can each be formed as a strand 7 containing a group of optical fibers. The group of fibers in such strand 7 are bunched together in a circular pattern, as shown in cross section in FIG. 6. Thus, each of the optical strands 7 may comprise a single optical fiber or a group of such fibers.

Figure 8:
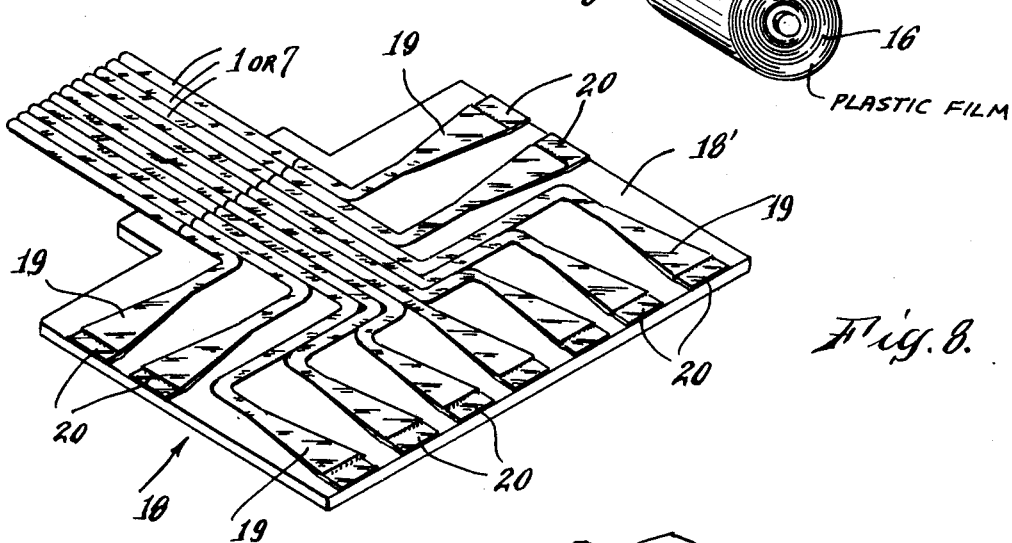
FIG. 8 is an enlarged perspective view of a connector for use with the flat optical cables shown in the preceding figures.

When it is desired to terminate one of the flat optical cables 10 or 10A, the connector 18 of FIG. 8 can be used to advantage. This connector 18 includes a flat, substantially opaque base panel 18' which is cast with a pattern of optically transparent elements 19 which terminate in multiple optical contact areas 20. The contact areas 20 are formed by clear plastic, such as acrylics which can be chemically welded to optical connectors, as shown in FIGS. 8 and 8A, in which optical strands 1 or 7 can be mechanically mounted.

Figure 8A:
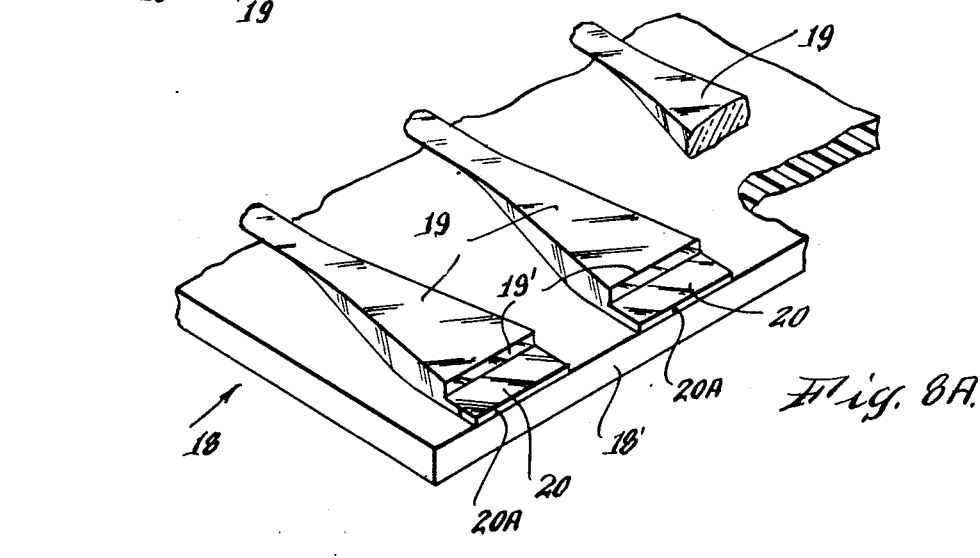
FIG. 8A is a further enlargement of an edge portion of the connector of FIG. 8 showing the individual optical connection members in greater detail.

In the connector 18, the optically transparent elements 19 each include a tapering transition region broadening out toward the contact areas 20, as seen most clearly in FIG. 8A. There is an optically transparent shoulder 19' adjacent to the transparent contact area 20.

It is noted that optical strands 1 or 7, made of transparent materials, such as glass or Crofon, a product of duPont, are easy and convenient to interconnect by mechanical means. A mechanical and optical connector is shown in FIGS. 9 and 9A in which an opaque, stiffly flexible, tubular sleeve 23 holds an optical contact tip 21 formed of material transparent to light radiation. This contact tip 21 has a flat area 21A adapted to seat upon one of the contact areas 20 of the connector 18. The end of the contact tip 21 abuts against the transparent shoulder 19'. A transparent adhesive or solvent, such as methyl ethyl ketone, is used to secure the contact areas 21A and 20 together. Also, the tip 21 includes a notch 21B which fits snuggly over the outer edge 20A (FIG. 8A) of the contact area 20.

The connector sleeve 23 has a constricted gripping lip 24 on its opposite end from the tip 21. This gripping lip 24 serves to embrace and hold on optical strand 1 or 7 inserted therein, as shown in FIG. 9A. The cross sectional shape of the sleeve 23 and lip 24 is circular when a circular optical strand 7 is to be connected thereby and is rectangular when a rectangular optical strand 1 is to be connected.

The tip 21 of the connector 23A may incorporate a slot 22 or a socket recess for close optical connection with the end of the optical strand 1 or 7. Thus, if desired, the optical strand 1 or 7 can be cemented in place by transparent cement material 25. Alternatively, the transparent material 25 can be an optional optical gel used to improve the optical connection. Such gel material 25 can be of a non-setting type or of a setting type. FIG. 9A shows the end of the optical strand 1 or 7 inserted into the connector sleeve 23 and received in the socket recess 22. The material 25 fills up any space between the end of the strand 1 or 7 and the bottom of the recess 22, thus transmitting the optical radiation through the connector 23A with very little attenuation.

FIGS. 10 and 10A show an optical and mechanical connector 23B for connecting an optical strand 1 or 7. This connector 23B includes a tubular sleeve 26 of material similar to that of the sleeve 23 in FIGS. 9 and 9A. The stiffly flexible gripping lips 24B have a circular or rectangular mouth depending upon the peripheral shape of the strands to be connected. If desired, a rectangular strand 1 can be connected to a circular strand 7 in which case the opposite ends 24B of the connector 22B have different shapes.

FIG. 10A shows the optical strands inserted into the connector 23B with the cement or gel material 25 surrounding their adjacent ends to provide good conductivity for light radiation to travel therebetween.

Dual Spectrum Transmission Systems

FIGS. 11 through 14 relate to dual spectrum transmission systems. Both light radiation and electrical energy are transmitted over the same transmission line. It is the purpose of the systems shown in FIGS. 11-14 to provide methods of conveying electromagnetic energy from point-to-point while also transmitting electrical signals over the same line.

It is a further purpose of these systems to provide means for increasing the amount of information transmitted over transmission line systems and to enable a transmission line to be used for multiple purposes.

A portion of a dual-spectrum transmission line 36 is shown in FIG. 11 which comprises a tube with tubular walls 31 of opaque material, such as rubber or plastic, filled with a transparent liquid 32 and having spaced electrodes 33 of electrically conductive material, such as copper, brass or aluminum with external electrical connections 34. The transparent liquid 32 in the tube comprises a light conduit capable of transmitting light radiation; this light radiation being modulated as an information carrier in a communication or control system. The light radiation transmitted through the transparent liquid medium 32 can be modulated with varying intensity or can be modulated in the form of digital pulses.

The applicant has also built such a system in which colored filters were used in order to transmit analog information by means of light radiation of one color or frequency range and digital information by means of light radiation of another color or frequency range. It was found that color-sensitive detectors were successful at the receiving end in separating the two types of optical signals being transmitted even though the transmissions were simultaneously being carried out.

When the transparent liquid 32 is not only a light conductor but also an electrical conductor as well, then the liquid 32 itself can be used for dual-spectrum transmission. An example of an organic liquid 32 with this dual capacity is dimethylformamide. FIG. 11 shows both light radiation and electrical energy being transmitted through the liquid core 32 of the dual-spectrum cable 36.

FIG. 12 shows a system utilizing such a dual-spectrum transmission line 36 with a light source 35 and electrical connections 34. Even though the dual-spectrum line is curved, there is both light energy output 37 and electrical energy output 37' at the line's further end.

FIG. 13 illustrates a dual-spectrum transmission line 36 which contains periodic amplifiers 38 for reinforcing the electrical signals. The spaced amplifiers 38 are connected to the electrodes 33. In the system shown in FIG. 13, the liquid core 32 is divided into compartments separated by optically transparent dividers 39. These partitions 39 are formed of dielectric material such that the electrical energy conducted in each compartment is insulated from that in the adjacent compartments. The electrodes 33 pick up the electrical signals and the feeder connections 34 convey the signals to the amplifiers 38 and also reintroduce the amplified signals into the succeeding liquid core compartment.

FIG. 14 illustrates a dual-spectrum transmission line 36A in which there is a transparent liquid core 32, an electrically conductive layer 41 formed by a metal film on a flexible tubular plastic wall 31. Another electrically conductive layer 43 is formed on the outside of the tubular wall 31 with an outer insulating layer 44. This transmission line 36A can convey multiple signals in both directions.

Optical Transmission Systems for Communcation between Various Peripheral Locations and Central Computer Stations There are a number of ways in which data in digital form is communicated to and from peripheral digital equipment and central computer locations. A common method is by use of telephone lines usually leased for this purpose. However, use of leased lines has proven to be somewhat expensive.

Microwave transmission is also used for such digital transmission. Use of remote satellites is still another means of transmitting digital signals. However, these prior systems suffer from a cost standpoint, or from over-crowding of frequencies, or from loss of intelligence through interference.

It is a purpose of the dual-spectrum systems to provide a novel and reliable method of communication between remote equipment and central computer facilities.

It is still a further purpose of such systems embodying this invention to provide means for transmission of high speed digital signals, while at the same time providing voice-grade lines for interhuman communication, for transmission of slow-speed data, and for transmission of instructional data.

The optical cables 10 and 10A, shown in FIGS. 1 through 6, and the optical cables 36 and 36A, shown in FIGS. 11 through 14, are capable of carrying analogue (intensity) modulated light radiation or digital (pulsed) modulated light radiation and electrical signals; these latter lines having been referred to as dual-spectrum lines.

It is to be understood that such transmission lines can be employed as connecting links in a transmission network designed to convey digital information. These optical cables 10, 10A, 36 and 36A have the capacity of wide frequency capability, and thus are superior in terms of quantity of information which can be transmitted. They have low noise characteristics, and have the added advantage of being able to convey the information in a variety of energy forms.

Advantageously, these optical cables can be encapsulated in protective insulation, sheathed in a conduit or inserted in existing feeder lines. For example, such optical cables as are disclosed herein can be inserted in natural gas conduits or oil pipelines.

A desirable application of such optical transmission lines is in avoiding high density communication areas by using these cables in bypassing such high density areas as major cities.

Since the quality of the signals remains high and can be further amplified and repeated, the output of the optical transmission lines described herein can be fed into microwave communication "skipper" stations which would cover areas where it is undesirable or unnecessary to install optical cable lines. Additionally, signals can originate in such skipper stations, be transmitted to a central collection center and then be fed to a computer via a combination of optical transmission lines and skipper stations. For example, users of peripheral equipment in a major city can have in their equipment inventory a transmitter operating on a UHF frequency. The digital signals transmitted as pulses of light radiation are converted into microwave radio pulses suitable for transmission and are then broadcast. A central collector-receiver station receives the microwave transmission, converts the signals into light pulses and introduces the light pulses into another optic transmission line. For example, an optical cable system in New York City can connect terminal equipment in various locations to a broadcast station with an antenna located on a tall building. This could then transmit and receive microwave signals to and from a second station located in Connecticut, for example. This second station can then be connected to a computer center via electrical cable or via an optic transmission cable. Variations of such a system are also possible, including computer-to-computer connections. Signals can be transmitted in both directions and can be introduced and retrieved at any point within the system.

It is also possible to collect signals from local sources through conventional transmission systems and convert said signals to a form suitable for long distance transmission. For example, a user in New York City might lease a short distance telephone line through the telephone system which would connect his terminal with a local collector. The collector then transmits the signal either over a UHF radio station, or through an optical transmission cable. This optical transmission line can travel the length of Long Island to a UHF radio station located near Montauk Point. To increase the capacity of such a system, a number of optical transmission lines can be combined in a main optical communication cable which can be laid in the ocean, say from Boston to Washington, D.C. Skipper stations, or local leased lines, connect the peripheral equipment to the optical cable, while the computer facility can be located at any point along the optical cable.

By limiting the use of leased telephone lines to local distances only, the carrying cost of such a system embodying this invention can be reduced considerably.

In summary, the composite data communication system incorporates a communication network involving the interconnection of optical communication cables and microwave broadcast-receiver units. There is the interconnection of optic transmission cables with remote digital equipment and with central computer stations. These optical cables are accessible to leased lines, to electrical cable, and to other optical transmission lines or broadcast-receiver units.

Optical Switches and Optical Control Systems Incorporating Such Switches

FIGS. 15, 16, 16A and 17 relate to optical switches. Optical switches within the terms of this disclosure refer to mechanical switches which pass or re-route light through optical fibers and/or strands depending upon the "on/off" state of the switches.

A push-button type of optical switch 46 is illustrated in FIG. 15 in which an opaque plastic mounting 45 is provided with a well 48 in which is positioned a movable push rod 50. The rod rests against a spring 49 and is provided with a light transmitting passage 51 which is held out of optical alignment with the optical strands 1 or 7 by the action of the spring. When the push rod 50 is depressed, the light transmitting region 51 is moved into optical alignment with the optical strands allowing light to pass through the switch 46.

In terms of this disclosure, when the push rod 50 is depressed, the optical circuit is completed, or, in other words, optical "contact" is made. When the rod is released, it returns to the normal position and the light passage is once again blocked, i.e., optical circuit is interrupted, or, in other words, optical contact is "broken".

A snap-action switch 46A is shown in FIGS. 16 and 16A in which a rotary member 54 rotates on a pivot 55 within a housing 53. The housing is provided with a pair of detents 52. A detent-engaging ball 58 is pushed outwardly by a spring 56 located in a well 57 in the member 54.

When the switch member 54 is rotated, by pushing on one or the other of the protruding finger actuators, the ball and spring become depressed and the ball 52 rides on the lower inner periphery of the housing until the opposite detent 52 is encountered. The angular movement of this member 54 brings the light transmitting passage 59 in and out of optical alignment, i.e. optical contact with the tips of the optical strands 1 or 7 which enter and exit on opposite sides of the rotary member.

A similar switch 46B is shown in FIG. 17 in which detents 62 are located in the periphery of the rotary member 61. When one or the other of the protruding finger actuators is pushed, the detents alternately engage a depressible spring 63 mounted in the housing. Thus, the light transmitting portion 59 of the switch member is brought into or out of alignment with the optical strands 1 or 7.

Optical control systems utilizing the optic switches 46, 46A or 46B are shown in FIGS. 18 through 21. These switches can be used to control the supply of electrical energy to any electrical load, such as an electric motor, a heater, a light, a home appliance or any other type of electrical equipment. Among the many advantages of these optical control systems are those resulting from the fact that dangerous electrical wiring running to and from the switches can be eliminated. In addition, savings in space and weight can be obtained by use of these optical control systems. These optic switches can be used in the home or industrial plants or in vehicles to control lighting functions or other electrical loads by replacing dangerous electrical wiring with non-electric optic line control systems. Not only does this simplify wiring of architectural structures and vehicles, but it eliminates many of the hazards associated with electrical wiring.

Figure 18:
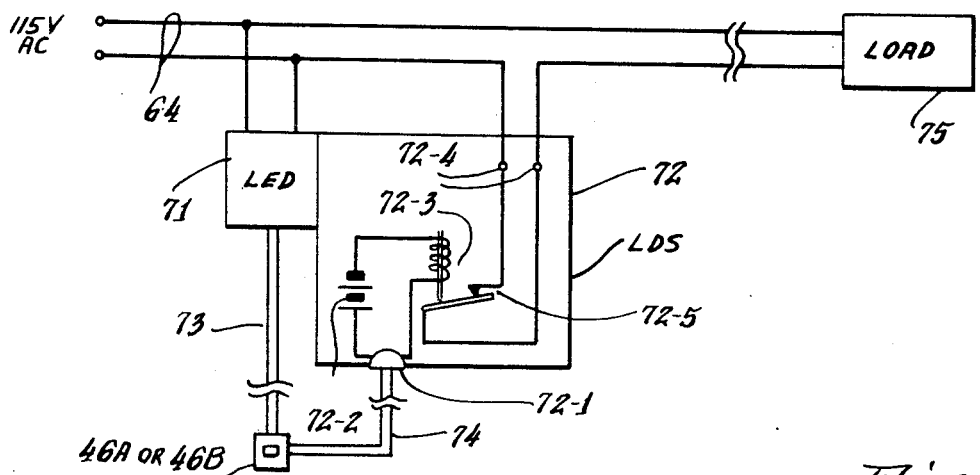
FIG. 18 is a schematic diagram of an optic switching and optic control system embodying the invention for controlling the supply of electrical energy to an electrical load.

In FIG. 18 an optical switch control system is disclosed in which a 115 volt alternating current (AC) line 64 serves to supply an electrical load 75, for example, such as a bank of overhead ceiling lights in a home or in a manufacturing plant. The electrical line 64 is advantageously entirely disposed in the ceiling or attic where it is completely and safely out of reach of any persons in the room below. This power line 64 which is disposed in the attic, or ceiling, operates a light emitting diode (LED) 71 or other small and low power light source and a light detecting switch circuit (LDS) 72 which is optically insulated from the light source 71. An optic line 73 runs from the light source down into the room below and connects with a snap-action optical switch 46A or 46B, this being a detent type switch that will allow the light to pass while in one position ("on"), and will block light passage in a normally "off" position. A second optic line 74 connects this switch 46A or 46B to the LDS 72.

The optic lines 73 and 74 may comprise two optic strands 1 or 7 in an optic cable 10 or 10A, such as shown in FIGS. 1 through 6. Moreover, the connections at the respective ends of the optic strands in these lines 73 and 74 may be made by the optical connectors 18, 23A or 23B, as shown in FIGS. 8, 8A, 9, 9A, 10 and 10A, as may be desired by the person installing the optical control circuits.

The light detecting switch circuit 72 includes a light radiation responsive cell 72-1, such as a selenium cell, which conducts electricity when light radiation strikes it. A source of electrical energy 72-2 energizes a relay 72-3 to close the electrical contacts 72-5 thus completing a circuit between the terminals 72-4 only when the light radiation strikes the cell 72-1. Accordingly, the load 75, such as a bank of electric lamps, becomes energized by the power lines 64 only when the optical switch 46A or 46B is turned to its "on" position.

In summary, when the optical switch 46A or 46B is "on" so that light passes from optical line 73 to optical line 74, the LDS 72 senses the light and closes the appropriate electrical circuit 72-4 and 72-5 to supply electricity to the appliance 75 being switched "on".

For convenience of illustration, the source of electrical energy 72-2 is shown by a battery symbol. It is to be understood that any appropriate electrical source may be used. In most instances, this electrical energy 72-2 for actuating the relay 72-3 is obtained from the power lines 64. For example, a small step-down transformer can be used as the electrical source 72-2. Its secondary winding is connected in the same manner as the battery symbol. Thus, low voltage AC serves to actuate the relay when light radiation impinges on the light responsive component 72-1.

In the optical control system of FIG. 18, the source of the controlling light radiation, namely, the low power light source 71, for example, such as a light emitting diode, neon lamp, small incandescent light bulb, or the like, is located closely adjacent to the light responsive control relay circuit 72. The manual control switch 46A or 46B is located remote from the control light source 71 and remote from the light responsive relay circuit 72.

Figure 19:
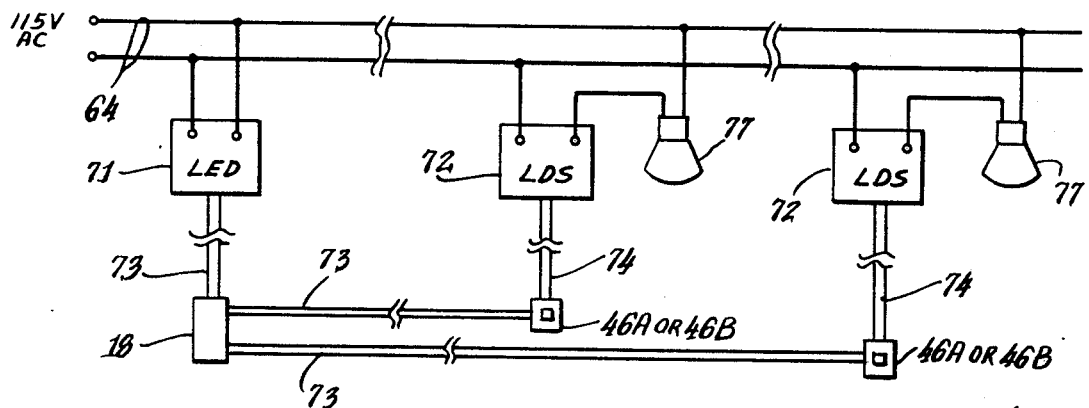
FIG. 19 is a schematic diagram of an optic switching and optic control system embodying the invention for controlling a multiplicity of electrical loads, such as a plurality of electric lamps.

FIG. 19 illustrates an optical control system in which a single control light source 71, for example, such as a light emitting diode or neon lamp, is used to provide individual control over several electrical loads 77. The controlling light source 71 is connected through an optic line 73 to an optical connector 18. A plurality of optic lines 73 extend from this one connector 18 over to a plurality of optical switches 46A or 46B. Thus, in FIG. 19 a single control light source 71 is being advantageously used to send controlling light radiation to a plurality of individual manual optical switches 46A or 46B.

From each of these switches there is a controlling optic line 74 which extends to the respective light responsive control relay circuits 72 for controlling the respective electrical loads 77. As an example, the electrical loads 77 are shown as overhead electric lamps controlled by the optical switches 46A or 46B.

The system of FIG. 19 has the advantage that the electrical power lines 64 can be located in the attic or ceiling where they are safely out of reach. Only the optical lines 73 and 74, optical connector 18, and optical switches 46A or 46B are within normal reach of human beings. Thus, the shock and fire hazards are reduced because the extent of electrical wiring is reduced and its placement is remote for human contact.

These same advantages also supply to the optical control circuits shown in FIGS. 18, 20, 21, 24, 27, 28, 29, 30, and so forth.

It is to be understood that throughout this entire specification corresponding reference numbers are used to indicate elements and components in the various figures having corresponding functions and characteristics. Thus, for example, as explained above, the optical lines 73 and 74 in FIG. 19 may comprise optical cables 10 or 10A including optical strands, such as 1 or 7.

The use of the optical connector 18 enables convenient installation to be made by connecting the various optical lines 73 into this connector. Thus, a large number of electrical loads can be controlled by their individual switches. The connector 18 also allows for future expansion of the system which can be accomplished by attaching additional optical control lines 73 to it.

Figure 20:
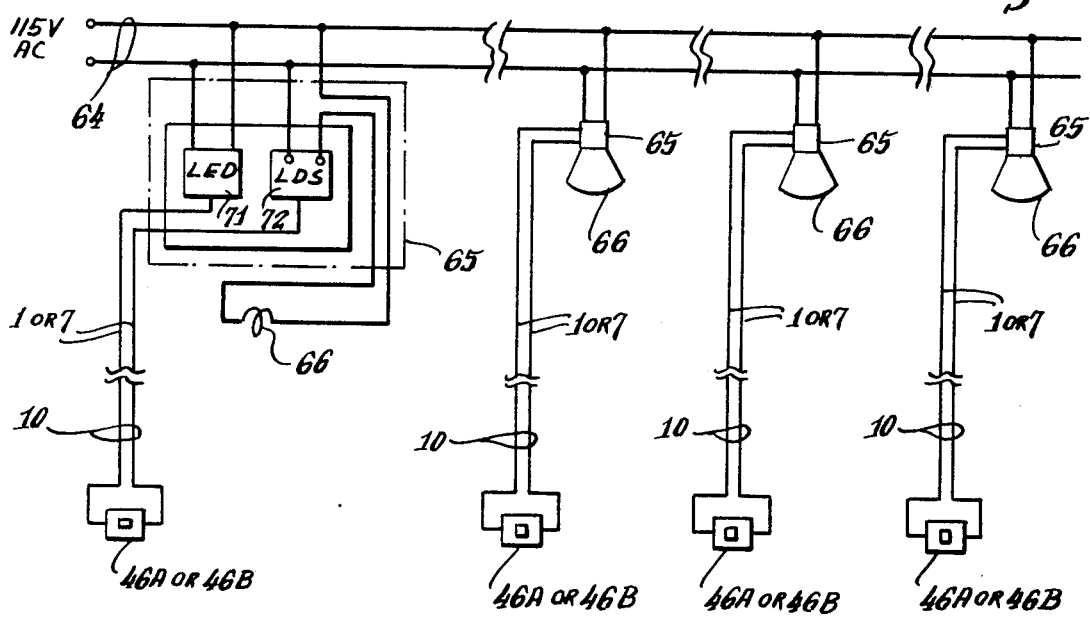
FIG. 20 is a schematic diagram of another optic switching and optic control system for controlling a plurality of electrical loads, such as electric lamps.

In FIG. 20 is illustrated an optical control system in which each of the electrical loads 66, for example, such as large overhead lamps, has its own associated control box 65. In each of these control boxes 65 there is a small controlling low power light source 71, such as a light emitting diode, a neon lamp, or a small electrical bulb. There is also a light-responsive switch circuit (LDS) 72 which has its relay terminals connected to the electrical load 66 to be controlled. The control boxes 65 are located in the electrical outlet, electrical or junction box, near the equipment 66 to be controlled. In the case of overhead lamps 66, as shown, the control boxes 65 are located in the socket outlet near the base of the lamp which is screwed into this outlet.

If desired, the optical control box 65 can be incorporated directly in the base of the electrical lamp 66. In such a construction, the base of the electrical lamp 66 includes a central light passage or optical contact port communicating with the light-responsive component 72-1. There are two concentric contact rings surrounding this central light port. In other words, the base of the lamp 66 is similar to a "three-way" bulb (50-watt, 100-watt, 150-watt) except that the center contact is replaced by an optical contact port. It is to be understood that the relay 72-3 and control switch contacts 72-5 can be very compact in the form of an electronic switch, such as a silicon-controlled rectifier. Thus, the electrical equipment 66 itself, such as a lamp, includes light-responsive means 72-1, and electrical switch means controlled thereby for turning the electrical equipment "on" and "off" in response to switched light radiation.

An optical cable 10 containing a pair of optical strands 1 or 7 extends from the control box 65 to a control switch 46A or 46B located at a convenient place in the room below. One of the optical strands 1 or 7 is connected to the controlling light source 71 and the other strand 1 or 7 is connected to the light-responsive switch circuit 72.

Figure 21:
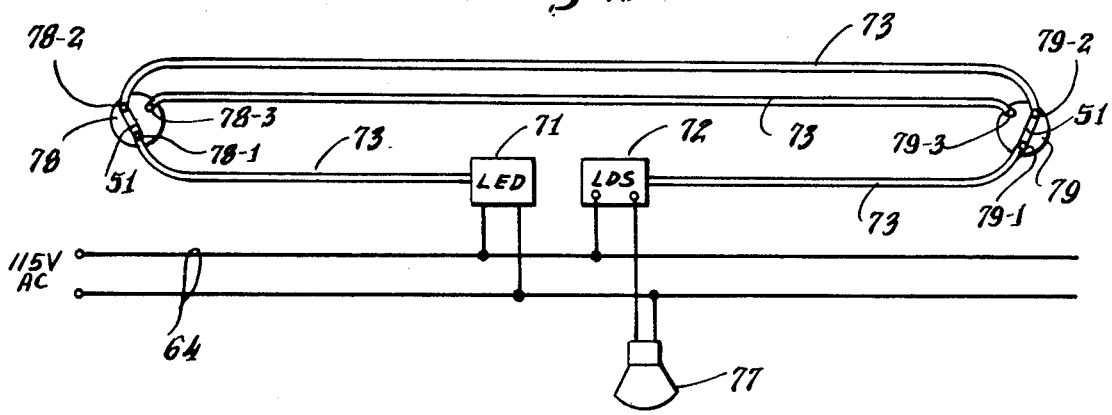
FIG. 21 is a schematic diagram of an optic switching and optic control system for turning an electrical load, such as an electric lamp, "on" and "off" from either of two remotely located optical switches.

FIG. 21 shows an optical control system for controlling an electrical load 77, such as a hall lamp, from either of two switching stations 78 or 79. The controlling light source 71 is connected through a first optical line 73 to a two-way optical switch 78 containing a light-transmitting switch region 51 (See FIG. 15) which can communicate between a first light transmitting port 78-1 and either of two light transmitting ports 78-2 or 78-3. There are a pair of optical lines 73 extending from these light ports 78-2 and 78-3, respectively, to a pair of similar light ports 79-2 and 79-3 in the other two-way switch 79. Then another light line 73 extends from the light port 79-1 at the opposite end of the light-transmitting region 51 to the light-responsive switch circuit 72. The ends of the switch regions 51 can be moved back and forth between the ports 78-2 and 78-3 and between the ports 79-2 and 79-3. Thus, when the light-transmitting switch regions 51 are moved into respective positions to complete an optical circuit from the control light source 71 to the light-responsive switch circuit 72, the electrical load 77 is turned "on", and vice versa.

Figure 22:
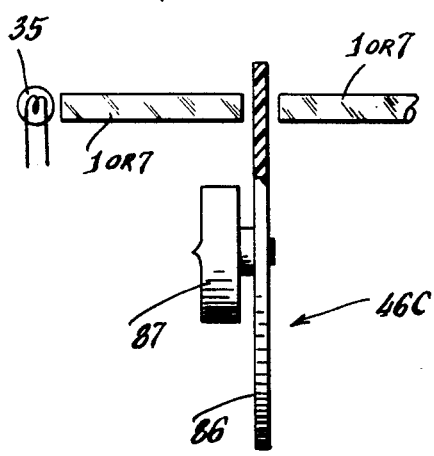
FIGS. 22 and 23 are side and front elevational views, respectively, of an optical dimmer switch or variable optical attenuator.
Figure 23:
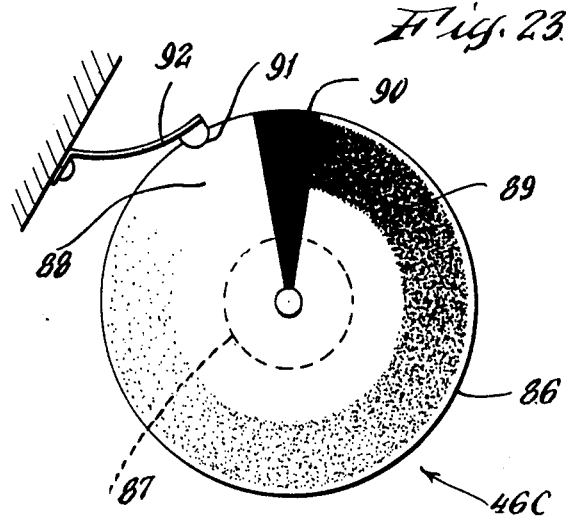

The ability to dim house lighting is desirable and can be done with a novel optic dimmer switch that can also be remotely located from the electrical power lines. FIGS. 22 and 23 show an optical dimmer switch 46C which has a rotatable control disc 86 serving to attenuate light by a variable amount. A manual control knob 87 is used to rotate the disc 86 to provide the desired amount of attenuation. A control light source 35 which may be a light-emitting diode, a neon lamp, a small light bult or any small low-power light source feeds light radiation through an input optical strand 1 or 7 to the switch 46C in which the disc separates this input strand from an output optical strand 1 or 7. The disc 86, which is further illustrated in FIG. 23, has an annular band 89 of a graduated light transmission capability with a highly transmitting area in the region 88. There is also a completely opaque section 90 which is used in the full "off" position. A detent notch in the disc 86 and a spring holder 92 serve to hold the disc 86 in the full "off" position. As the disc is rotated, the amount of light passing from the input to the output is controlled by the relative opacity of the graduated band 89 at any given point.

Figure 24:
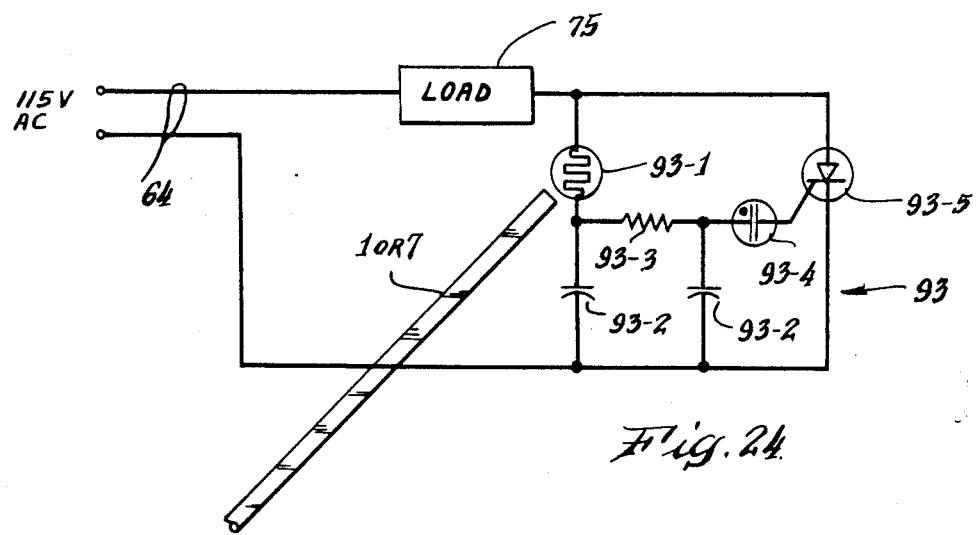
FIG. 24 is a schematic diagram of a control circuit in which the amount of electrical energy being supplied to a load is varied remotely by the dimmer switch of FIGS. 22 and 23.

As shown in FIG. 24, the resulting variable amount of light radiation is passed through the optical strand 1 or 7, to the control circuit 93, in which the initial presence of light turns the circuit "on", and the intensity of the variable light radiation coming from the dimmer switch controls the amount of energization of the load light 75 in the control circuit 93. The electrical load 75, such as a lamp, is connected to the electrical power lines 64 in series with a silicon-controlled rectifier 93-5. A light-responsive photocell component 93-1, for example, such as a selenium cell is connected through a filter resistor 93-3 and a neon lamp 93-4 to the control electrode of the silicon-controlled rectifier 93-5. A pair of filter capacitors 93-2 are connected between the ends of the filter resistor 93 and the opposite power line.

As the intensity of the light radiation falling on the photocell component 93-1 is increased by turning the dimmer switch, the brightness of the lamp 75 is increased, and vice versa. This optical dimmer switch 46C can be used to control not only room lighting but also universal type (AC-DC) electrical motors as well. Thus, it acts as a motor speed control, with the added safety feature of the control switch 46C being remote from the electrical power lines.

A similar dimmer switch in which the disc 46C is controlled by a bimetallic heat sensor 87 can be used for controlling an electrical heater which thereby responds to ambient temperature changes. Further, since the dimmer switch 46C has no electrical connections at the dimmer site, the entire switch can be operated under water with complete safety, with only the optic input and output lines passing through the liquid surface. These optical lines carry the control light radiation down to the switch and carry the variable light radiation up to the remote electrical circuit 93 being controlled. Such optical dimmer switches 46C and associated control circuit 93 can be used in and under pool areas to remotely control light levels in and around pools and advantageously can be used safely in bathroom areas for light and temperature control. These optical dimmer switches associated with bimetallic heat sensors 87 can be used to provide temperature control in liquids and can be used for control purposes in explosive-hazard areas, and in and around liquids where there is a flash point danger.

FIGS. 25 and 26 show a four-pole fifteen position optical switch 94 which can be used to advantage with optical input lines 73 and output lines 74 provided by flat optical cables, such as 10 or 10A, containing multiple optical strands 1 or 7. This optical switch 94 can be used to control various electrical loads 66, 75, 77 in remote locations. Moreover, this optical switch 94 can be used as a master switch for routing light radiation through the respective output lines 74 in various combinations to other optical switches 46, 46A, 46B or 46C which, in turn, serve to control the various electrical loads.

In the optical switch 94, shown in FIGS. 25 and 26, a rotatable disc 94-1 mounted on a shaft 95 has a series of concentric annular bands 96 each containing multiple segments 97 and 98 of differing opacity. The segmental areas 97 provide clear optical transmission and they alternate in occurrence in each band 96 with opaque segmental areas 98. This four-pole switch has four bands 96 each band being divided into areas 97 which are clear, and areas 98 which are opaque. The bands are arranged so that certain opaque areas and certain clear areas are radially aligned. When the disc is positioned, as shown in FIG. 26, with four optical input lines 73 separated from four optical output lines 74 by the disc, then light can pass from the input line 73 to the output lines 74, according to the position of the disc and which portions of the bands are either clear or opaque. Thus, the switch shown can be constructed to pass light between the individual optical lines in any desired combinations as determined by the clear and opaque patterns of the bands 96 on the disc. A pattern can be used to provide any particular desired predetermined switching sequence of combinations. For example, when the input and output lines 73 and 74 are radially aligned, as shown, and when the pattern of the areas 97 and 98 is as shown in FIG. 25, the switching sequence is provides as indicated by the sequence of numbers from 1 to 4, arranged at uniform spaced positions around the perimeter of the disc 94-1. Number 1 indicates that light passes through the inner band, number 2 indicates light passing the second band from the center, and so forth. The sequence of combinations shown is as follows: OFF, 1, 2, 3, 4, 1 and 2, 1 and 3, 1 and 4, 2 and 3, 2 and 4, 1 and 2 and 3, 1 and 3 and 4, 2 and 3 and 4, 1 and 2 and 4, 1 and 2 and 3 and 4.

Further, when the clear and opaque areas 97 and 98 are arranged to correspond with digital number positions, and when the optical lines 73 and 74 are arranged in a row corresponding to binary numbers, the switch acts as a mechanical digital-to-binary converter. Further, the position of the switch can be sensed remotely by the light radiation pattern in the respective output lines 74. Thus, the switch can be used as a position indicator on a rotating device, such as a motor shaft, or a weather vane. Thus, the position of the switch can be determined remotely through the optical lines. For position indication purposes, the respective bands 96 of the switch can be divided very finely, so as to provide as precise an angular division as desired.

FIGS. 27, 28 and 29 show an optical control system for a vehicle incorporating optical switching, for example, as adapted for an automobile or boat or truck.

The present invention simplifies the connection and control means for the various equipment used in such a vehicle. This optical system advantageously eliminates much of the complicated copper wiring in such a vehicle and increases the reliability of the equipment operation while also saving the time-consuming wiring labor involved in the prior art.

It is the purpose of this invention to localize the electrical connections and wiring in a vehicle by substituting non-electrical optical control means in the dashboard area. While the optical control system being disclosed at this time uses a multiplicity of optical strands, later in this same specification there will be described another optical control system for operating vehicle equipment using single optical strands over which a multiplicity of control signals are passed for controlling the respective items of equipment.

As shown in FIG. 27, there is a low-power optical control source 35 for providing light radiation. This optical source 35 may be a small, low-power incandescent light bulb, a neon lamp, a light emitting diode, a fluorescent lamp or a screen, a gaseous discharge lamp or any other small low-power source of light radiation. These same inclusive comments concerning the nature of the optical control source of light radiation also apply to the optical control sources 35 and 71, shown in the other figures.

The source 35 (FIG. 27) can be located at any convenient place in the vehicle, for example, beneath the dashboard. An optical line 73 serves to transmit light radiation from the source 35 to a plurality of optical switches 46 and 46A or 46B-1,-2,-3,-4. These switches serve to control the light radiation being transmitted through the five optical control lines 74 which can be bundled together where convenient to form a cable protected by a casing 102. It is to be understood that additional items of vehicle equipment can also be optically controlled as indicated by the "ETC." legend on the drawing near the vehicle power lines 103 and 104. A vehicle electrical power source 105, for example, such as a storage battery re-charged by a vehicle generator or alternator and rectifier, is connected to the power lines 103 and 104. If desired, the "grounded" line 104, which is shown connected at 106 (near the battery terminal) to the vehicle chassis or frame can be a common return circuit provided by the metal chassis or frame of the vehicle itself.

The push button switch 46 in the center of the steering wheel 101 controls the light radiation fed through an optical strand 74 to the light-responsive switching circuit 72-1 which, in turn, controls the electrical energy fed from the power circuit 103–104 through electrical connections 107-1 and 108-1 to the horn.

The snap-action switches 46A or B-1,-2,-3 and -4 are located on the dashboard and control the light radiation fed through the respective optical strands 74 to the light-responsive switching circuits 72-2, 72-3, 72-4 and 72-5, respectively. These latter light-responsive circuits 72-2, 72-3, 72-4 and 72-5 control the electrical energy fed through the electrical connections 107-2 to 5 and 108-2 to 5, to the "parking lights", "headlights dim" (low beam headlights), "headlights bright" (high beam headlights), and windshield wipers. Other items of equipment can be controlled conveniently by adding additional optical switches, control lines 74 and light-responsive switching circuits 72.

It is to be noted in the system of FIG. 27 that the electrical power lines 103 and 104, and interconnections 107 and 108, can be positioned in the vicinity of the equipment items themselves. Thus, the vehicle wiring is simplified.

In addition to the other advantages discussed above, the use of the small compact light-weight optical strands 73 and 74 provides a significant savings in weight of the vehicle which, in turn, yields significant savings in wear and tear and in fuel, tires, operating costs and maintenance costs.

An optical ignition switch 111 is shown in FIG. 28 in which a key inserted into the tumbler cylinder 110 is used to rotate the cylinder to turn "on" the ignition. Attached to the cylinder 110 is a movable arm 112 which is optically transparent and which is optically coupled to an annular band 117 of optically transmitting material mounted on the lock cylinder 110. Thus, the annulus 117 and arm 112 are turned about the axis of the tumbler cylinder 110 when the key is turned by the operator. Adjacent to the outer edge of the transparent annulus 117 is an optically transparent shoe 113 of arcuate configuration. This shoe 113 is contiguous to the annulus 117 and embraces a portion of the perimeter of this annulus in light transmitting relationship therewith. Thus, light radiation transmitted from the optical control source 35 through the optical line 73 and into the shoe 113 is transmitted into the movable annulus 117 and out to the end of the switch arm 112 in all positions of the cylinder 110. The movable arm 112 can be rotated by the key to bring it into position against and aligned with respective optical contacts 114, 115 and 116 which are connected by optical control lines 74-1, 74-2 and 74-3, respectively, with light-responsive switching circuits (not shown), such as those discussed above at 72 to initiate the starting and vehicle operative functions. The optical line 74-1 can be connected to a light-responsive switching circuit which enables certain "auxiliary" vehicle equipment items, such as the radio and parking lights, to be turned "on" without energizing the main ignition circuit for the engine and main vehicle lights. The optical line 74-2 is connected to the optical contact 115 which is adjacent to the normal "on" position of the ignition switch 111. The line 74-2 is connected to a light-responsive switching circuit which enables all of the vehicle equipment to be turned "on". The optical line 74-3 extends to a light-responsive switching circuit which energizes the engine starting motor when the arm 112 is adjacent to the optical contact 116.

These optical lines 74-1 and 74-3 can be further inter-connected with optical switches connected to the engine transmission shift levers which allow the passage of control light signals only when this "gear" shift lever is in the appropriate positions for starting the engine, such as being in "park" or "neutral".

In FIG. 29, there is shown an integral optical switch control panel 120 which is cast from plastic material to include optical transmission lines 73-1 to 73-8 and optical control lines 74-1 to 74-8 upon an opaque base. This panel 120 further simplifies the installation in a vehicle of an optical control system embodying the present invention. The panel 120 is generally similar in construction to the converter 18 (FIGS. 8 and 8A). The control light radiation supply line 73 couples to a line 73' extending along the centerline of the panel 120 and serves to feed light radiation into all of the branch supply lines 73-1 to 73-8. The reference numbers 121, 122, 123, 124, 125, 126, 127 and 128 indicate cut-out spaces into which the optical switches 46, 46A or 46B are insertable. In their inserted positions in these spaces 121-128, these switches serve to control, i.e. turn "on" or "off", the light radiation passing from the supply lines 73-1 to 73-8 into the respective optical control lines 74-1 to 74-8.

An optical connector 23A couples the light radiation supply line 73 with the supply line 73' extending along the centerline of the control panel 120. Similar optical connectors 23A serve to connect the respective control lines 74-1 to 74-8 to optical control lines 74 which extend to the respective light-responsive switching circuits 72 for controlling the feeding of electrical energy to the vehicle equipment items, as shown in FIG. 27.

Also, a dimmer switch 46C can be associated with the control panel 120 for dimming the level of illumination being provided by the dashboard instrument lights. The optical control line 74 (1 or 7) running from the dimmer switch 46C extends to an intensity-responsive control circuit, such as the circuit 93 shown in FIG. 24 which, in turn, controls the lightness of the dashboard illumination, shown as load 75 in FIG. 24.

A mechanical switch 130 which sends a series of light pulses through an optical control line 74 is shown in FIG. 30. The switch includes a numbered dial 134 which is connected by a shaft 137 to a second disc 135 having a series of light port openings 136. When the number dial 134 is rotated to the start position, lever 131 is displaced, allowing light radiation to pass from the optical supply line 73-1 into a further supply line 73-2. A spring return (not shown) spins the number dial and the pulse disc 135 which chops or pulses the light according to the number of holes 136 and the digital number dialed. These resulting light pulses are passed through an optical control line 74 and are sensed by a light-responsive photocell detector 138, which is associated with an electronic digital-to-binary converter 139. The electrical pulse signals produced by the photocell 138 in response to the light radiation pulses arriving through the control line 74 are fed into the converter 139 which converts the algebraic number of the pulses into a corresponding binary number 1, 2, 4, 8, etc., as indicated at 140. These resulting binary number electrical signals can be fed into a computer or into any other utilization circuit.

If desired, the converter 139 can produce different audible tone signals each representative of a particular number on the dial 134. These tone signals can then be transmitted over a telephone line for controlling remote relays in the telephone system to provide the selection of the subscriber's telephone which the user of the dialing switch 130 wishes to reach.

A pin 132 on the number dial 134 strikes the lever 131 to return it to its initial position when the dial 134 returns to its initial position, as shown.

It was discussed above in connection with FIG. 27 that a single optical control line 74 can be used to control line 74 can be used to control the various items of equipment in a vehicle. This is accomplished by placing a push button plunger at each of the switch locations in FIG. 27. Such a push button plunger 50 is shown in FIG. 15, and it is arranged to rotate an associated apertured disc, such as the disc 135 shown in FIG. 30. The push rod 50 is extended and formed into a rack and a pinion mechanism is used to turn the disc 135, so that depressing the plunger 50 causes the dial 135 to rotate. Each dial 135 has a different number of light ports 136. Thus, when the operator pushes a respective plunger a predetermined number of light pulses is transmitted to all of the light-responsive switching circuits 72-1 to 72-5, etc. These circuits 72 each include pulse counters, and each one is arranged to respond to a different number of pulses. Accordingly, depressing a particular one of the push buttons will only energize a corresponding particular item of vehicle equipment, and so forth.

Each of the light-responsive pulse-counting switching circuits 72 also includes a latching relay mechanism which retains the item of vehicle-equipment in its energized condition until the particular push button is again depressed to transmit a second similar sequence of optical pulses. This second similar sequence of light pulses causes the light-responsive switching circuit 72 to release its latching relay to de-energize the associated item of equipment. A third similar sequence of light pulses serves to again energize the item of vehicle equipment, and so forth.

Electro-Optical Switching and Logic Modules and Systems

This section of the specification deals with the cooperative interaction of optical and electronic effects in order to provide further control and switching of light radiation. It includes a disclosure of logic modules which are electrically powered, but which are stimulated into operation by the presence or absence of light. It is one purpose of these logic modules to provide a method of incorporating logic decisions directly into optical paths. Other purposes and applications will be explained further below.

FIGS. 31A and 31B show a schematic representation and a circuit diagram, respectively, of a light intensity meter sampling and light amplifying module 140. The light flow meter samples the amount of light passing through an optical system, such as would be made up by a series of interconnecting optical strands 1 or 7. At the same time, the amount of light detected is used to trigger an amplifier circuit which, in turn, drives a light emitter source so that, in effect, the input light in line 73 is sampled and then is amplified for reintroduction into an optic output line 74. The amplification of the light is linear so that while the output light radiation is greater in intensity, it is an analog of the input light.

Light radiation is fed into the module 140 along the input optical line 73, and amplified light radiation is fed out through an output optical line 74. Electrical energy is supplied through the terminal connections 141 and 142. As shown in FIG. 31B, the module 140 includes a light-responsive photocell 93-1 of the type whose electrical conductivity progressively increases as the intensity of the incident light radiation increases, for example, such as a selenium cell. Since the resistance of the photocell 93-1 varies inversely as a function of the intensity of the light, the current passing through this cell controls the voltage of the base of a transistor 143 in an amplifier circuit. The resulting amplified electrical current flowing through the collector electrode drives a light radiation emitter, such as a light-emitting diode or incandescent lamp 144. This light source 144 of variable intensity feeds light radiation into the output line 74.

The amplified light radiation from the variable source 144 also is directed onto a second photocell 93-2 of the variable resistance type which controls the current flow through a potentiometer 145. This potentiometer has its sliding contact connected to the base electrode of a second transistor 146. A meter 147 is connected between the collector electrode of the second transistor 146 and the positive side 141 of the electrical energy supply connections 141 and 142.

Accordingly, as the input light intensity increases the intensity of source 144 also increases to provide increased intensity of light radiation in output line 74 and increased light onto the photocell 93-2. The collector current of the transistor 146 increases to cause the meter 147 to show an increased reading. When the input light intensity in line 73 decreases, the opposite occurs.

The inventor has found it desirable to miniaturize the electronic components by components by combining certain semi-conductor functions. For example, it is desirable to construct a single silicon wafer upon which is built a complete amplifier circuit which includes a light-responsive photocell transistor amplifier circuitry and a light emitter diode. The light detector and the light emitter are optically isolated with respect to each other. In a less optimum system, it is possible to eliminate the light detector by simply exposing an ordinary transistor chip to light, which, in turn, controls the amount of current flowing into the amplifier circuit as a function of the incident light intensity.

The inventor has, in fact, constructed a miniature amplifier by the expedient of removing the case from around a transistor and directing the input optical line 73, so that the chip is exposed to the light radiation. The leads from this exposed transistor were connected to an integrated amplifier circuit chip, along with power supply leads and a light-emitting diode was connected across the output of the amplifier chip. The clear case of the light-emitting diode was filed down and then polished to make the light-emitting diode extremely flat. The entire package with all the components occupied a space only one-half inch square and less than one-quarter inch deep. The optic lines 73 and 74 were then attached to the component unit using transparent cement and were arranged in such a manner so that the input line to the transistor chip and the output line from the light-emitting diode were optically isolated from each other. The whole was then encapsulated in potting compound with only the two optic lines 73 and 74 and the two power supply leads 141 and 142 emerging from the surface. Thus was formed a practical miniature light amplifier insertable directly into a fiber optic line, which occupied a minimum of space. However, in later models of phototransistors were used in similar encapsulated units since the photoelectric effect in a phototransistor is greater than in an ordinary transistor with the case removed.

The most practical method of constructing a module, such as described in this specification, involves the manufacturing of a phototransistor chip, an integrated circuit chip, and a light-emitting diode chip. Alternatively, the phototransistor chip and the integrated circuit chip can be made on the same wafer. The various chips are then bonded to a common substrate, and the electrical interconnections are made. Alternatively, the common substrate can contain a printed circuit pattern which completes the appropriate circuitry when the chips are bonded and then soldered to the substrate. The whole unit is then encapsulated leaving appropriate leads emerging from the unit for other electrical connections and including optical ports for inserting the optical lines. Again, the optical input and output lines are shielded from each other.

When the function of the encapsulated unit is to act as an optical latching circuit, then it is desirable to allow the photoconductor to "see" the photo-emitter.

During the construction of these miniature circuits, a further extremely interesting invention was made. Many of these circuits, as will be further described in this specification, function as logic circuits such as optical AND gates, OR gates, NAND gates, logic inverters, and flip-flops. The chips are placed on substrates of uniform size forming squares and rectangles having related dimensions, and further, optical windows (ports) are provided instead of optic line connections. When these optical windows are placed so that the chips can be arranged to fit side-by-side with the output optical windows (outer ports) on one substrate matching (aligned with) the optical input windows (input ports) on another substrate, then an optical logic system results from arranging the substrates in a suitable mosaic. In order to make the formation of the logic circuit more convenient, a "mother board" is used in which is arranged a pattern of holes for the insertion of the logic modules. The mother board also contains appropriate circuitry for supplying electrical power to the power leads 141 and 142 of the respective modules.

In some cases, it is desirable to make the integrated logic circuitry selective to certain modulation of the light radiation. When the integrated circuit is made selectively responsive to certain modulated optical signals, the logic module then responds only to and amplifies only those light radiation signals appropriately modulated.

The module can also be made with external connections so that externally applied modulation can be applied to the light radiation being processed by the module. For example, by modulating the electrical energy being fed into the terminals 141 and 142 (such as by a sine wave or square wave or pulse modulation of the electrical energy), the amplified light provided by the light radiation source 144 will be similarly modulated.

Further, these optic modules can be made to respond only to certain frequencies of light. Thus, if optical signals are multiplexed and fed into an optical line, then a module at the receiving end of this optic line will respond only to those frequencies to which it is tuned.

In addition, these optic modules can be made so that they excite only when pulses of light of a certain time duration are received and sensed. Also, these optic modules can be made so that they are tuned to accept light radiation signals of one frequency, but emit amplified light radiation signals of a different frequency. By these modifications, the present invention enables multiple layers of optical logic modules to be built up and also accomplishes multiplexing of optical logic signals. Thus, a single optic line can carry both multiplexed light radiation signals and multiple levels of logic. A simple optical AND gate thus becomes a dual level, four condition AND gate in which there must not only be two light radiation input signals, but also two light radiation input signals of the same frequency. For example, one method of frequency controlling light radiation and making the optic modules frequency responsive is to include optical color filters in the input and photoresponsive sensing sections of the modules. Thus, a light radiation signal having the frequency of red light is ignored by an optic module having, say, a green or blue selective input filter but this red optic signal is accepted and responded to by modules having red selective filters. In this continuing description of electro-optical modules and switches, it is to be understood that the switches and modules disclosed can be either of non-tuned or a tuned type; that is, they may have color selective filters in their inputs and/or they may be selectively responsive only to certain modulated optical signals.

FIGS. 32A and 32B illustrate an optical "OR" gate module 150 in which there are two light radiation input lines 73-1 and 73-2 and one light radiation output line 74. If a light signal appears at either of the inputs, or both, it is detected, amplified and output light is emitted. The module 150 can also function as a mixer for combining light radiation signals.

As shown in FIG. 32B, the "OR" gate module 150 includes a pair of photocells 93-1 and 93-2, in the form of photoconductive cells, connected in parallel between the negative side 142 of the electrical power source and the base of 9 transistor 143, respectively. Accordingly, light radiation directed onto either of the light-responsive cells 93-1 or 93-2 causes collector current to flow through a light radiation emitting source 144. The resulting light radiation from the source 144 is fed out of the module 150 through the optic line 74.

FIGS. 33A and 33B illustrate optical "AND" gate module 160 in which two light radiation inputs in the optical lines 73-1 and 73-2 are required in order for there to be light radiation output in the optical output line 74. This module 160 also functions as a mixer providing there are two optical input signals on the two input lines 73-1 and 73-2.

As shown in FIG. 33B, the "AND" gate module includes a pair of photocells 93-1 and 93-2' in the form of photoconductive cells, connected in series between the negative side 142 of the electrical power source and the base electrode and transistor 143. When both light-responsive elements 93-1 and 93-2' are excited by light radiation simultaneously occurring in the optical lines 73-1 and 73-2, current flows through the collector electrode of the transistor 143 energizing the light radiation emitting source 144. The resulting light radiation from source 144 is carried out of the module 160 by the optical line 74.

Simultaneously modulating the intensity of the light radiation in the two input lines 73-1 and 73-2 with two different optical signals, the transistor 143 and light-emitting source 144 serve as a mixer of these two signals. Consequently, the light radiation output in line 74 is a composite optical signal resulting from a mixing of the two incoming optical signal.

FIGS. 34A and 34B illustrate an optical "NAND" gate module 170 in which either one or both light inputs in the lines 73-1 and 73-2 will turn "off" a normally occurring light radiation output in line 74. An effective arrangement for the module 170 is shown in FIG. 34B in which two photosensors 93-1 and 93-2' in the form of photoconductive cells are connected in parallel between the base electrode of a transistor 143 and the positive side 141 of the electrical power source. The base electrode is also connected through a biasing resistor 171 to the negative power connection 142. This biasing resistor 171 serves to provide a flow of trigger current to hold the base electrode at a negative voltage relative to the emitter to place, i.e. to trigger, the transistor 143 normally into "on" condition; that is, in condition for current to flow through the collector to energize the light emitting source 144. Accordingly, light radiation normally is present in the optic output line 74.

When light radiation is present in either or both of the optic input lines 73-1 and/or 73-2, the corresponding photoresponsive cells 93-1 and/or 93-2' become conductive to shunt the emitter-to-base circuit, thus shutting "off" the transistor 143 to stop light emission from the source 144.

FIGS. 35A and 35B illustrate an optical "Logic Inverter" module 180 in which light radiation input in line 73 turns off a normally occurring light radiation output in line 74. The absence of light input results in light output. This inverter module 180 can be constructed as shown in FIG. 35B which is similar to the NAND module 170 of FIG. 34B, except that one of the photo-responsive cells is omitted.

When light radiation strikes the photoconductor cell 93-1 in the module 180, the emitter-to-base circuit of the transistor 143 is shunted, thus turning "off" this transistor to de-energize the light source 144.

Figure 36A:
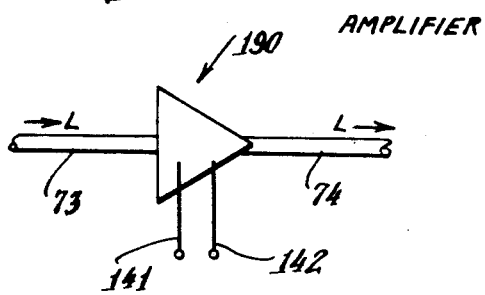
FIGS. 36A and 36B show a light radiation intensity amplifier module.
Figure 36B:
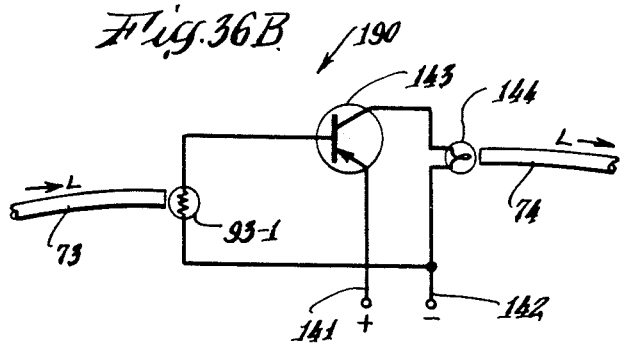

FIGS. 36A and 36B illustrate a light radiation intensity amplifier module 190 in which a relatively weak light radiation input is sensed and is responded to for providing a stronger light output. This module 190 is extremely useful in optical transmission lines which must run for long distances. A convenient construction involves the inclusion in the module 190 of two pre-drilled ports into which the respective optical lines 73 and 74 can be inserted. A transparent, optical gel, either of a setting or a non-setting type, is provided in these ports to seal, hold, and make good light-transmitting optical connection between the inserted optical strands and the module.

It is believed that it will be helpful to the reader to emphasize the usefulness of this module 190. If, in a long fiber optic transmission line, the light signal becomes attenuated by distance or by imperfections in the line, then the user can conveniently cut the optic strand, put a few drops of gel on the ends of the optic strand or in the module ports, and then plug the ends of the line into the ports in the module. The appropriate power supply is then connected to terminals 141 and 142 and the optical transmission is in operation.

It also is pointed out that the amplifier module 190 also functions as an optical diode in that it will only pass light radiation in one direction, namely, from input line 73 into output line 74. Such optical diodes can be used in diode matrixes, such as can be used in embodiments of this invention, to convert optical digital signals to binary optical signals and they may advantageously be used at optical connection points to prevent light transmission from entering certain predetermined lines in a computer or control system.

The optical amplifier module 190 or optical diode can be constructed, as shown in FIG. 36B. A photoresponsive cell 93 is connected between the base of transistor 143 and the power connection 142, and a light radiation emitting source 144 is connected with the collector electrode. It is noted that the module 190 can be similar in construction to the first amplification stage of the module 140 in FIG. 31B.

Figure 37A:
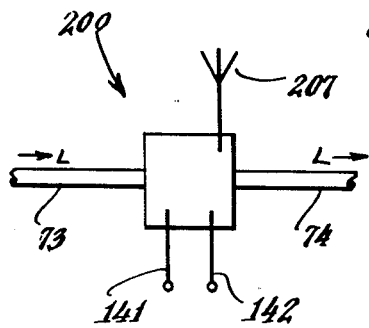
FIGS. 37A and 37B show a light radiation intensity amplifier and radio frequency output module.
Figure 37B:
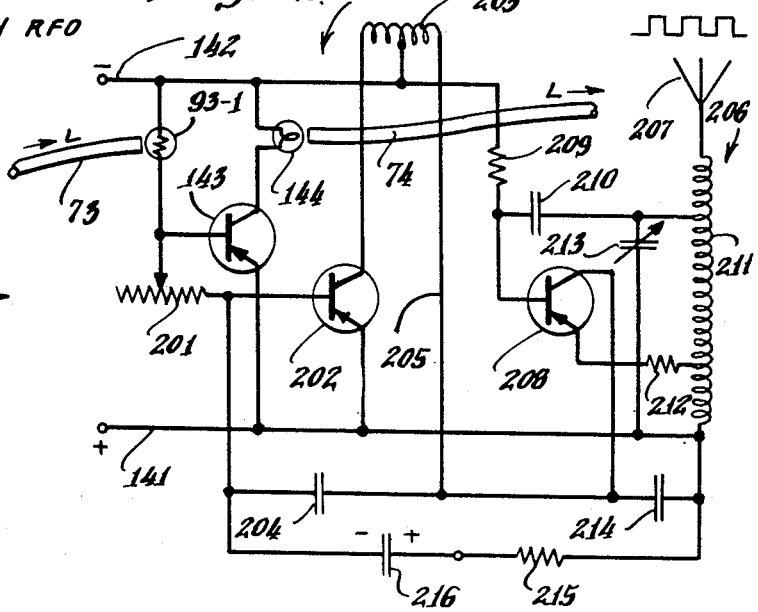

FIGS. 37A and 37B illustrate an optical amplifier and radio frequency output module 200 in which in addition to there being a light input detector and amplified light output, there is also a radio frequency signal output. This radio frequency output is tone-modulated by the intensity and variations of the light radiation in the input line 73. This module 200 is not only a detector-amplifier and switching system but also is a remote signalling module.

An input signal in the optical input line 73 actuates the photoconductive cell 93-1 causing collector current to flow through the light radiation source 144, thus transmitting amplified light through the optical output line 74. This first stage of the module 200 is similar to the module 190.

A potentiometer 201 couples the electrical signal generated across the photoresponsive cell 93-1 to the base of a second transistor 202 in an audio oscillator circuit 205 including a coil 203 and capacitor 204 connected in series between the collector and base of the transistor 202. Thus, the audio frequency or tone generated by the oscillator circuit 205 varies as a function of the intensity of the light radiation incoming on line 73.

A radio frequency (RF) oscillator circuit 206 which drives an antenna 207 is controlled by the audio oscillator 205. This RF circuit 206 includes a transistor 208 having its collector connected to the juncture of the coil 203 and capacitor 204 with the transistor base connected through a resistor 209 to the negative power lead 142. The transistor base is coupled through a capacitor 210 to a tap on an output coil 211, and the emitter is connected through a resistor 212 to another tap on the coil 211. An adjustable capacitor 213 is shunted across the coil 211. There is a capacitor 214 coupling the collector to the positive power lead 141. A resistor 215 in series with a capacitor 216 couples the base of the transistor 202 to this power lead 141.

Figure 38A:
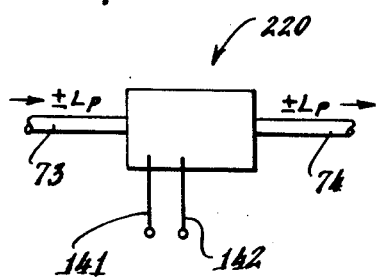
FIGS. 38A and 38B show an optical flip-flop module.
Figure 38B:
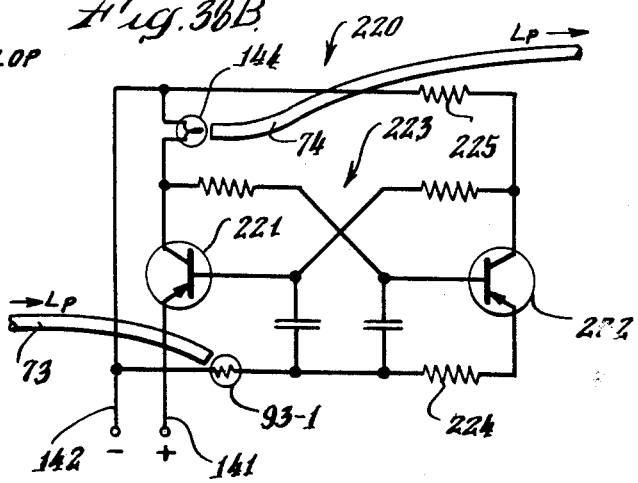

FIGS. 38A and 38B illustrate an optical flip-flop module 220 in which its "on/off" state is controlled by the most recent optical input pulse in a series of optical pulses arriving in the optical input line 73. Taking a random state, for example, say that the flip-flop module 220 is on the "ON" state, then there is a steady light output in the optical output line 74. When a light input pulse arrives in line 73, the flip-flop turns "off", so that there is no light radiation output in line 74. When another light pulse is sensed at the input, then the module turns "on" again, and so forth. The flip-flop module 210 described can also be made so that instead of emitting continuous light radiation when the module is on the "on" condition, it will emit a burst (pulse) of light whenever it is flipped into its "on" condition.

The flip-flop module 220 includes two transistors 221 and 222 with their respective collectors connected to the base of the other transistor through a resistor-capacitor network 223. A photoresponsive element 93-1 is connected from the negative power lead 142 through a resistor 224 to the emitter of the transistor 222. A light radiation emitting source 144 is connected from the collector of the transistor 221 through a resistor 225 to the collector of the other transistor 222 with the juncture of the source 144 and resistor 225 being connected to the negative power lead.

Accordingly, whenever the transistor 221 is conducting current through its collector electrode to energize the source 144, the module 220 is considered to be "on", for light is being emitted from source 144 through the output line 74. Whenever the other transistor 222 is in condition to conduct collector current, the module 220 is "off" and no light radiation output occurs in line 74.

This flip-flop module 220 has advantageous applications in computer and memory systems. It is also useful from the standpoint of switching. For example, when this module 220 is used as an optical switch for controlling electrical components and circuits in systems, such as shown in FIGS. 18, 19, 20, 21, 24, 26, 27, 28, 29 and 30, then a first pulse or flow of light radiation sent through the line 73 turns "on" the module 220 which then sends light radiation through the line 74 to a light-responsive switching circuit 72 or to a photoresponsive element 93-1 to turn "on" the electrical equipment or circuit being controlled. A second pulse or flow of light transmitted through the line 73 in the module 220 serves to turn "off" the equipment or circuit being controlled, and so forth. A switch such as 46, 46A or 46B can be used to send light pulses or a flow of light radiation through the optical line 73.

In FIGS. 39A and 39B there is shown a light-responsive amplifier gate module 230 providing both audible and optical (AO) output signals when light radiation is arriving through the input line 73. The optical output is sent through the optic line 74, and the audio electrical signals are provided at the terminals 231 and 232 of the secondary winding of an output transformer 223. The light radiation emitting source 144 in optical contact with the output line 74 is energized by current flow through the collector of the transistor 143. The transistors 143 and 146 are arranged in a push-pull configuration to drive the primary winding 234 of the output transformer 233. A capacitor 235 shunts this primary winding and the respective collectors of the two transistors 143 and 146 are connected to opposite sides of this primary winding, so as to drive it. A capacitor 236 is connected between one side of the winding 234 and the base of the transistor 146. The photoresponsive element 93-1 is connected from the opposite side of the primary winding 234 through a resistor 237 to the base of the transistor 146, and a resistor 238 is connected from the base of the transistor 143 to the junction of photo-responsive cell 93-1 and resistor 237.

It is to be understood that the various module circuits shown in FIGS. 31B through 39B, inclusive, are representative of suitable electronic circuits for performing the electro-optical functions described. In these various embodiments PNP transistors are shown and it will be understood that equivalent circuits can be constructed by those skilled in the art utilizing NPN transistors. For example, in the case of those modules in which only a single transistor is employed, an NPN transistor can be used in lieu of an NPN transistor by reversing the polarity of the electrical energizing source 141, 142. Therefore, the various module circuits shown in FIGS. 31B-39B are to be understood as representative of but not exhaustive of embodiments of the present invention.

As discussed further above, these modules can be advantageously constructed in integrated circuit form, so as to occupy a minimum amount of space in an installation, such as in a chemical process control system, in control systems for manufacturing operations, in communication networks, computer networks and appliance or equipment control systems for home, office or factory.

Moreover, it is to be understood that the pulsed light radiation can be replaced by light radiation of variable intensity for use with analog electro-optical modules.

In FIG. 40 there is shown a pulse generating diode matrix 240. This pulse generating matrix includes a number of push-button switches 241, 242, 243, 244, 245, and so forth. These push-button switches are associated with pulse generators 251, 252, 253, 254, 255, and so forth, respectively. These pulse generators are connected through diodes 261, 262, 263, 264, 265, and so forth, to an output line 270 connected through a light emitting source 144, to a source of electrical energy as indicated at 271. Accordingly, when the user presses anyone of the push-button switches, the corresponding generator generates a number of electrical pulses, as indicated by the pulse symbols 272 corresponding in number to the number on the switch that was depressed. These pulses pass through the light radiation source 144 to emit pulses of light corresponding in number to the number of electrical pulses 272. These pulses of light radiation pass through the optical output line 274 to a light-responsive circuit network, including an OA gate module 230 having its audio output connected through an electronic amplifier 273 and fed into a decoder circuit 274 which counts the number of audio signals resulting from the light pulses arriving through the line 74. After the number of pulses has been counted, the decoder circuit 274 then pulses the appropriate input coil 281, 282, 283, 284, 285, and so forth, of an electronic flip-flop unit (not shown). The particular flip-flop 281-285 which is pulsed acts to turn "on" an electrical switch for producing a desired control function. When the same numbered push-button 241-245, and so forth, is again depressed, the result is a second pulsing of the same flip-flop unit 281-285, and so forth, resulting in turn "off" of the previously energized electrical circuit.

Other electro-optical modules which can advantageously be constructed are, for example, a Beeper module in which the intensity of a light input controls the pulsing rate of a light output. The Beeper module emits pulses of light, the number of pulses per second depending upon the intensity of the light radiation input being supplied through an optical input line.

A Sampling module has multiple optical inputs and a single optical output. Depending upon the time base of a given module, the module accepts light from the first input for a given period of time, it then switches and samples the light at the second input, and so forth. After sampling the final optical input line in a sequence, the module recycles to the first input to begin the sampling sequence again.

A Touch Switch module includes a proximity sensor, such as a thermal detector, so that contact with a human hand causes a change of state in the module which controls and changes the characteristics of the output light from the module to produce a desired control function, such as controlling an elevator.

A Latching module is responsive to a pulse of light radiation in the input line, which results in the turning "on" of the module, so that there is now a constant light output even though the input pulse is removed. A second input optical line, which may be considered the "turn off" line is used in the module so that a pulse of light appearing at the turn off input line causes the Latching module then to turn "off".

A Stepping module has a single optical input line and multiple optical output lines. There are a number of modes of operation which can be combined in the Stepping module or used in different modules. In one mode, this module responds to pulses of light so that the pulses add and the module cycles to the next output line in sequence at each input pulse. Another mode is controlled by the intensity of light, so that each selected output line in a sequence corresponds to a different predetermined intensity of the input light radiation. A separate "set-to-zero" input line can be provided for cycling the module back to its initial condition, if desired.

A Momentary Pulse Switch module is one in which a short variable input pulse of light radiation turns the module "on". However, the output pulse is of a set predetermined time duration. A Pulse Translator Modulator module is one in which a modulated light pulse of one frequency on the input line produces a modulated light pulse of another frequency in the output line.

A Metered Integrator module is one in which the position of the indicator needle on the meter is governed by the number of optical input pulses.

Optical Medical Systems

In the treatment of medical patients, it is desirable to monitor certain body functions. These measurements can be made far more reliably in many cases, if they are made internally. Further, there are some continuing medical treatments that can be made far more reliable if they could be accomplished in the body. However, this is often not possible because of the danger arising from making electrical connections. The danger of shocking the patient limits the use of electrical connections to the patient.

An alternative to these procedures is one that uses optical lines to provide connections between the sensors implanted in the body and the external monitoring or treatment equipment. Further, the use of optical strands 1 or 7 passing through the skin out of the body which is being treated presents no shock hazard to the individual since there is no electrical current traveling through such optical transmission lines. In addition, by incorporating the logic modules previously described in this specification, then multiple optical lines can be used, or a single optical line can be used in which the various data is transmitted over this one line by optical multiplexing. This optical multiplexing is provided, for example, by using light radiation of various wavelengths and various colors to transmit data from the various sensors, thereby to provide control over the operations and functions of the internal sensors and internal and/or external treating devices.

Various Optical Control Systems

Various systems of optical switching and control using the switches and modules described above include illumination control, machinery control, automated process control functions and automatic equipment control, monitoring of pilot flames, smoke and fire detectors. These smoke and fire detectors optically make the decision that smoke or flames are present and then initiate a call to a fire department or to a police department. These optical systems can interface between competing but non-compatible equipment such as mini-computers and peripheral equipment. They can be used in underwater and hazardous area switching functions, and optic transmission networks in which the optical lines and modules are capable of decision making.

I claim:

1. A mechanical and optical connector for making a light radiation transmitting connection between two optically transparent elements comprising a stiffly flexible opaque tubular sleeve, an optical contact element of transparent material having a transparent shank portion extending into a first end of said sleeve and having a projecting tip end with a flat area on said projecting end adapted to seat in optical contact with another mating contact element for making said connection therebetween, the second end of said sleeve having an axial opening for receiving an optical strand inserted therein adjacent to the shank portion of said contact element, and said flat area on said projecting tip of said contact element extending in an axial direction defined by a notch in said tip which also provides a stop shoulder extending transversely of said tip.

2. A mechanical and optical connector for making a light radiation transmitting connection between two optically transparent elements comprising a stiffly flexible opaque tubular sleeve, an optical contact element of transparent material having a transparent shank portion extending into a first end of said sleeve and having a projecting tip end with a flat area on said projecting end adapted to seat in optical contact with another mating contact element for making said connection therebetween, the second end of said sleeve having an axial opening for receiving an optical strand inserted therein adjacent to the shank portion of contact element, and said shank portion of said contact element having a socket recess therein located within said sleeve for receiving the end of an optical strand inserted into the second end of said sleeve.

3. A mechanical and optical connector as claimed in claim 2, including optically transparent fluid material associated with said socket recess for improving the optical connection between the shank portion of said contact element and an optical strand inserted into the second end of said sleeve.

* * * * *